(12) United States Patent
Kholaif et al.

(10) Patent No.: US 8,881,238 B2
(45) Date of Patent: Nov. 4, 2014

(54) AUTHENTICATION FAILURE IN A WIRELESS LOCAL AREA NETWORK

(71) Applicant: BlackBerry Limited, Waterloo (CA)

(72) Inventors: Ahmad Mohammad Mohammad Kholaif, Waterloo (CA); Ion Barbu, Waterloo (CA); Krishna Kumar Bakthavathsalu, Toronto (CA); Nayef Fawaz Mendahawi, Kitchener (CA); Denis Fedotenko, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 14/168,315

(22) Filed: Jan. 30, 2014

(65) Prior Publication Data

US 2014/0148131 A1    May 29, 2014

Related U.S. Application Data

(62) Division of application No. 12/900,774, filed on Oct. 8, 2010, now Pat. No. 8,695,063.

(60) Provisional application No. 61/250,544, filed on Oct. 11, 2009.

(51) Int. Cl.
*G06F 15/16*  (2006.01)
*H04W 12/06*  (2009.01)
*H04W 48/16*  (2009.01)
*H04W 8/00*   (2009.01)

(52) U.S. Cl.
CPC .............. *H04W 12/06* (2013.01); *H04W 48/16* (2013.01); *H04W 8/005* (2013.01)
USPC ........ 726/3; 726/2; 726/5; 713/153; 709/223; 709/224; 709/225; 380/270; 455/410; 455/411

(58) Field of Classification Search
CPC ..... H04W 12/06; H04W 48/16; H04W 48/20; H04W 36/0072; H04W 92/02
USPC .............. 726/2, 3, 5; 713/153; 709/223–225; 380/270; 455/410–411
See application file for complete search history.

(56) References Cited

U.S. PATENT DOCUMENTS 7,886,343 B2 *  2/2011  Sullivan et al. ................... 726/5
8,549,293 B2 * 10/2013  Hahn et al. ..................... 713/168

(Continued)

FOREIGN PATENT DOCUMENTS

EP     1530322     5/2005
EP     1545146     6/2005

(Continued)

OTHER PUBLICATIONS

3GPP system to Wireless Local Area Network (WLAN) interworking; System description; 3GPP TS 23.234 V6.5.0, 2005.

(Continued)

*Primary Examiner* — Thanhnga B Truong
(74) *Attorney, Agent, or Firm* — Integral Intellectual Property Inc.; Miriam Paton

(57) ABSTRACT

In the event of an authentication process failure, a mobile station bans a connection profile storing the credentials provided by the mobile station when initiating the failed authentication process, thus affecting how subsequent scans—other than discovery scans—and connection attempts are handled. In the event of an authentication process failure, a mobile station bans or suppresses an access point with which the mobile station initiated the failed authentication process. The mobile station refrains from transmitting any communications addressed to the unique identifier of any banned access point. The mobile station may ignore any communications received from a banned access point. Suppressed access points are occasionally not made available to the mobile station for selection as a target for a connection attempt.

7 Claims, 21 Drawing Sheets

(56) References Cited

U.S. PATENT DOCUMENTS

| | | | |
|---|---|---|---|
| 2002/0009199 A1 | 1/2002 | Ala-Laurila et al. | |
| 2004/0090930 A1* | 5/2004 | Lee et al. | 370/328 |
| 2004/0236939 A1 | 11/2004 | Watanabe et al. | |
| 2006/0280128 A1 | 12/2006 | Abdel-Kader | |
| 2008/0295144 A1 | 11/2008 | Cam-Winget et al. | |
| 2009/0245176 A1 | 10/2009 | Balasubramanian et al. | |

FOREIGN PATENT DOCUMENTS

| | | |
|---|---|---|
| WO | 2006066181 | 6/2006 |
| WO | 2008061347 | 5/2008 |

OTHER PUBLICATIONS

Larcinese, Concetta, Extended European Search Report for EP 10159813.4, Oct. 13, 2010.

Larcinese, Concetta, Extended European Search Report for EP 10187075.6, May 21, 2013.

Larcinese, Concetta, First Exam Report for EP 10187075.6, Oct. 7, 2013.

Larcinese, Concetta, Partial Search Report for EP 10187075.6, Mar. 20, 2013.

Li, Mei, First Office Action for CA 2,717,282, Mar. 28, 2013.

Li, Mei, Second Office Action for CA2,717,282, Feb. 6, 2014.

Siddiqui, Imran, First Office Action CA2717327, Jul. 16, 2013.

Siddiqui, Imran, Second Office Action for CA2,717,327, Oct. 23, 2013.

Sinkantarakorn, Pawaris, First Office Action for U.S. Appl. No. 12/758,898, Jul. 31, 2012.

Sinkantarakorn, Pawaris, Notice of Allowance for U.S. Appl. No. 12/758,898, filed Jan. 10, 2013.

Team Digit, "Online Over the Air", http://www.thinkdigit.com/General/Online-Over-The-Air__1236.html If you enter the key incorrectly, a pop-up message will appear stating 'Incorrect WEP key', and you will have to re-enter the key. Jun 1, 2006.

Truong, Thanhnga, Advisory Action for U.S. Appl. No. 12/900,774, filed Aug. 27, 2013.

Truong, Thanhnga, Notice of Allowance for U.S. Appl. No. 12/900,774, filed Nov. 22, 2013.

Truong, Thanhnga, Restriction Requirement for U.S. Appl. No. 12/900,774, filed Oct. 11, 2012.

Truong, Thanhnga, Second Office Action for U.S. Appl. No. 12/900,774, filed Jan. 15, 2013.

Truong, Thanhnga, Third Office Action for U.S. Appl. No. 12/900,774, filed Jun. 21, 2013.

Yacc, "reply to Question for WEP Key when it is wrong inserted", http://old.nabble.com/Question-for-WEP-Key-when-it-is-wrong-inserted-td15847726.html WEP in Open System is used to protect data not authentication. One way to detect the correctness of WEP key is to send out several ethernet broadcast with special pattern. Then, you can check if you receive them or not. If the key is wrong, you will get Mar. 28, 2008.

Siddiqui, Imran, Third Office Action for CA2717327, May 22, 2014.

* cited by examiner

AUTHENTICATION FAILURE IN A WIRELESS LOCAL AREA NETWORK

TECHNICAL FIELD

The technology described herein generally relates to wireless local area networks. In particular, the technology described herein relates to failure of a mobile station to authenticate with a wireless access point.

BACKGROUND

For ease of illustration, the various techniques disclosed herein are discussed below in the context of IEEE 802.11-based wireless networking. This context is described in the IEEE 802.11 specifications for wireless local area network (WLAN) media access control (MAC) and Physical Layer (PHY). However, those of ordinary skill in the art, using the teachings provided herein, may implement the disclosed techniques in other wireless networks. Accordingly, references to techniques and components specific to IEEE 802.11 apply also to the equivalent techniques or components in other wireless network standards unless otherwise noted.

A WLAN is identified by its network name, which in IEEE 802.11 is known as a service-set identifier (SSID). An infrastructure basic service set (BSS) is defined in IEEE 802.11 as a single AP together with all its associated mobile stations (STAs), and is uniquely identified by its basic service-set identifier (BSSID). Since an AP is uniquely identified by its MAC address, the MAC address of the AP is used as the BSSID. BSSs are connected to one another via networks denoted distribution systems (DS). Multiple DSs may be interconnected by routing devices. A subnetwork is a portion of a network that shares a common address component and operates at Layers 1 and 2 (physical and data link) of the OSI (Open System Interconnection) reference model. On TCP/IP (Transmission Control Protocol/Internet Protocol) networks, subnetworks are all devices whose Internet Protocol (IP) addresses have the same prefix. Routers, and the process of routing, operate at Layer 3 (network) of the OSI reference model. In IEEE 802.11 an Extended Service Set (ESS) includes two or more BSSs that use the same SSID.

Having a STA join an existing BSS is a multi-stage process, involving scanning, selection of a target AP, authentication, association, and IP address acquisition.

Stage 1—Scanning:

The STA scans, using passive scanning or active scanning or any combination thereof, to identify APs in whose coverage area the STA is currently located. In active scanning, the STA transmits at least one probe request specifying a particular network name and may receive a probe response from an AP configured with the particular network name. The STA extracts details about the AP and the WLAN from the received probe response(s) and adds the details for each received probe response as a record to the scan results of active scanning. In passive scanning, the STA receives beacon frames from APs or probe responses destined for other STAs or both. The STA extracts details about the AP and the WLAN from the received beacon frame(s) and the received probe response(s) and adds the details for each received beacon frame and each received probe response as a record to the scan results of passive scanning A record in the scan results may include at least the following extracted details about the AP and the WLAN: a unique identifier of the AP, for example, its MAC address; the network name of the WLAN; an identification of the frequency band on channels of which communication in the WLAN is conducted; an identification of the channel on which the beacon frame or probe response was received; an indication of the security type implemented in the WLAN; and if applicable to the security type, an indication of the encryption type implemented in the WLAN. The record may also include an indication of the strength of the received signal.

A non-exhaustive list of examples for the security type is, in no particular order, no security, Wired Equivalent Privacy (WEP), Pre-Shared Key (PSK), and Extensible Authentication Protocol (EAP). The EAP security type has several subtypes, for example, Lightweight EAP (LEAP), Protected EAP (PEAP), EAP Transport Layer Security (EAP-TLS), EAP Tunneled Transport Layer Security (EAP-TTLS), EAP—Flexible Authentication via Secured Tunneling (EAP-FAST), EAP for GSM Subscriber Identity Modules (EAP-SIM), and EAP—Authentication and Key Agreement (EAP-AKA). Temporal Key Integrity Protocol (TKIP) and Counter-Mode/CBC-Mac Protocol (CCMP) are two examples for the encryption type that are applicable to the PSK and EAP security types.

Stage 2—Selection of Target AP:

The STA selects a target AP with which to attempt a connection.

A STA may store in its memory one or more connection profiles, which are editable via a user interface component of the STA. Each connection profile includes a network name of the WLAN. The network name uniquely identifies the connection profile in the STA, so that no two connection profiles stored in the same STA include the same network name. A connection profile is optionally labeled with a profile label. A connection profile may include indications of other network details, for example, one or more of the following: a security type, a security subtype, an authentication method, and an encryption type. A connection profile may also include credentials for use with the implemented security type or with the authentication method or with both. A connection profile may also include other information, for example, Internet Protocol (IP) network parameters.

Selecting a target AP may involve comparing the scan results to one or more of the connection profiles stored in the STA. A target AP whose beacon frame or probe response is in the scan results is considered a match to a particular connection profile if the following network details of the particular connection profile and the network details of the beacon frame or probe response are identical: network name, security type, and encryption type.

Stages 3 and 4—Authentication and Association:

If the security type is "Open System" or a form of Shared Key Authentication such as "WEP" or "PSK", then authentication precedes association. The authentication process for an "Open System" simply consists of two communications: an authentication request from the STA to the target AP, and an authentication response from the target AP. In the case of "WEP" or "PSK", the authentication process is initiated by the STA sending to the target AP an authentication request that includes parameters of the identified profile relevant to the authentication process.

If the security type is EAP, which in the case of an IEEE 802.11 system means that the IEEE 802.1x standard is used, then the STA must successfully complete an association process with the target AP before the IEEE 802.1x authentication procedure begins. The association between the STA and the target AP is the port to be secured with the EAP authentication process. In the EAP authentication process, the STA initiates the authentication process by sending an appropriate packet to the target AP, which passes the packet on to an authentication server. An Authentication, Authorization and Accounting (AAA) server and a Remote Authentication Dial In User Service (RADIUS) server are both examples of an authentication server.

Stage 5—Dynamic IP Address Acquisition:

This stage is skipped if the STA has a static IP address. If the STA does not have a static IP address, then once the STA is associated with the target AP, the STA performs a dynamic IP address acquisition process with the target AP, which typically passes the request on to a DHCP (Dynamic Host Configuration Protocol) server. If encryption is implemented in the WLAN, the dynamic IP address acquisition process involves encrypted data packets.

Stage6—Connection Completed:

The STA is considered to be connected to the BSS once the STA is associated with the target AP, and either the STA has a static IP address or the STA has acquired a dynamically-allocated IP address. Data packets exchanged between the STA and the target AP are encrypted if encryption is implemented in the WLAN.

In order to enable a STA to be truly mobile, the STA is typically powered by a battery. Power consumption and battery drain are issues of concern.

BRIEF DESCRIPTION OF THE DRAWINGS

The technology described herein is illustrated by way of example and not limitation in the figures of the accompanying drawings, in which like reference numerals indicate corresponding, analogous or similar elements, and in which:

FIGS. 4-1, 4-2, 4-3 and 4-4 are flowcharts illustrating specific example methods to be performed by a mobile station for un-banning one or more connection profiles;

FIGS. 9-1, 9-2 and 9-3 are illustrations of example screenshots displayed at a mobile station;

FIGS. 14-1 and 14-2 are flowcharts illustrating specific example methods to be performed by a mobile station for un-suppressing one or more access points;

Figure 1:
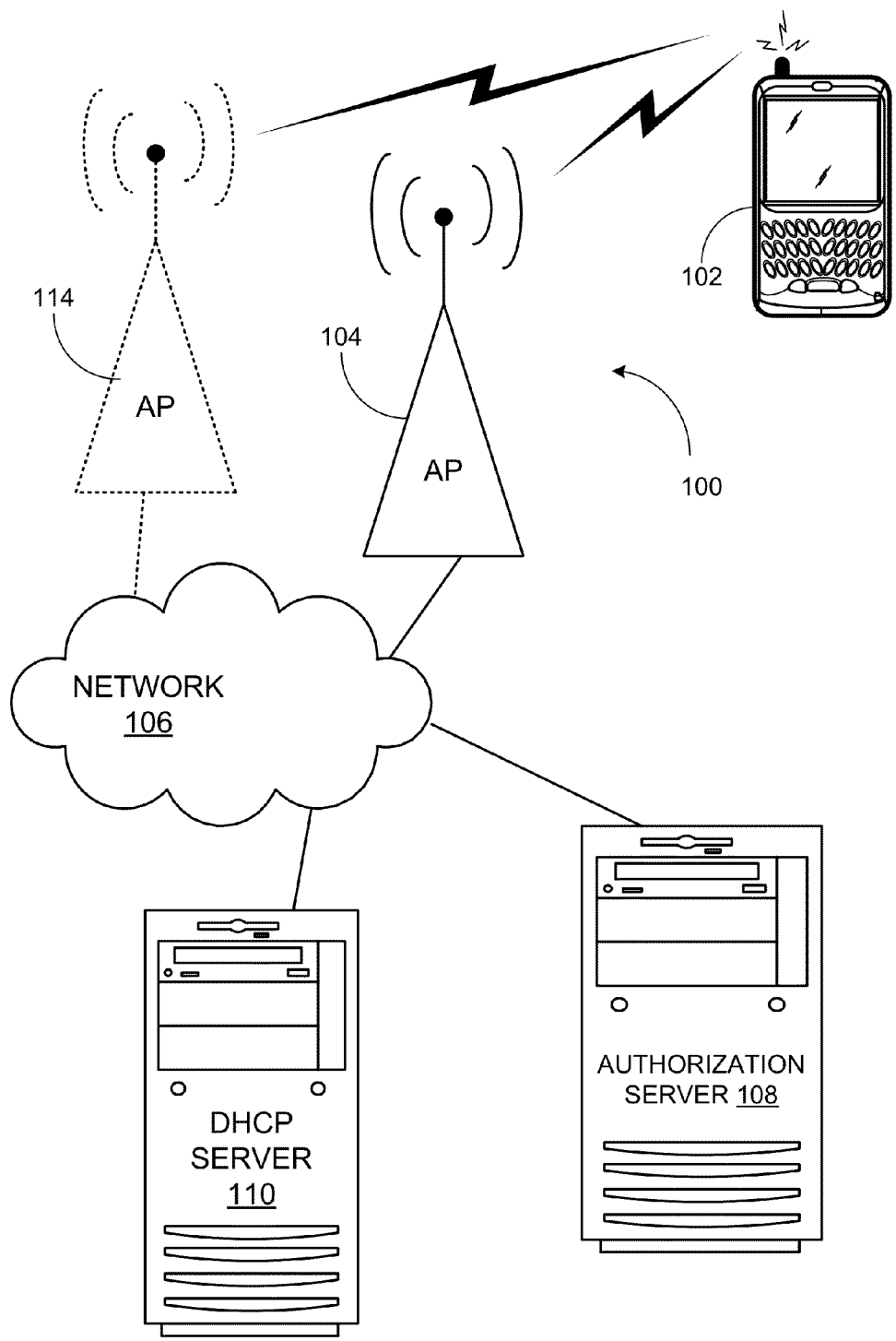
FIG. 1 is an illustration of an example wireless communication system.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

For ease of illustration, the various techniques disclosed herein are discussed below in the context of IEEE 802.11-based wireless networking. However, those of ordinary skill in the art, using the teachings provided herein, may implement the disclosed techniques in other wireless networks. Accordingly, references to techniques and components specific to IEEE 802.11 apply also to the equivalent techniques or components in other wireless network standards unless otherwise noted.

Authentication is a power-intensive process. Failure of a STA to successfully conclude an authentication process with a target AP or authentication server can significantly drain the battery that powers the STA, especially if the same AP is repeatedly selected as a target for connection.

A timer is started by the STA when the STA initiates an authentication process. A STA will determine that the authentication process has failed if any of the following conditions is met:

(1) the timer has expired ("authentication timeout failure") and no authentication success message from the target AP has been received by the STA prior to the expiration of the timer; or (2) before the expiry of the timer the STA has received an "invalid credentials" error message from the target AP; or (3) before the expiry of the timer the STA has received an authentication failure message from the target AP.

The "invalid credentials" error message will be sent if there is a mismatch between the credentials expected by the access point or authentication server and the credentials provided by the mobile station when initiating the authentication process. A non-exhaustive list of examples of credentials includes a passphrase, a username, a password, an IMSI (International Mobile Subscriber Identity), a certificate, a certificate having an expiry date. Authentication timeout failure may occur, for example, if there are network problems or if the authentication server is unavailable. The authentication failure message may be sent if the security type is "Open System" and the target AP forbids the particular STA (identified by its MAC address in the authentication request) to connect to the target AP.

Various techniques to be implemented by a mobile station in the event of an authentication failure are described herein. In some of the techniques described herein, a connection profile that stores the credentials provided by the mobile station when initiating the failed authentication process is banned. As explained in more detail below, the banning of a connection profile affects how subsequent scans—other than user-requested network scans, also known as "discovery scans"—and connection attempts are handled. In other techniques described herein, a unique identifier of the target AP with which the mobile station initiated the failed authentication process is banned or suppressed. As explained in more detail below, the banning or suppression of a target AP affects how subsequent scans and connection attempts are handled.

Overview—Banning of Connection Profiles

The STA excludes a banned connection profile from active scanning other than active scanning performed as part of a discovery scan. The STA filters results of passive scanning—other than passive scanning performed as part of a discovery scan—to remove from the results records including the network name of a banned connection profile. APs configured with the network name of a banned connection profile will therefore not be eligible for selection as a target AP by the STA, thus preventing repeated failed authentication processes.

Suppose the mismatch in credentials is due to misconfiguration of a particular AP and the WLAN is also supported by one or more other APs in which the credentials are not misconfigured. While the connection profile for the network name of the WLAN is banned, the STA will not be able to select any of the properly-configured APs as a target AP.

In the techniques described herein, a connection profile is banned only temporarily, and the STA will "un-ban" a connection profile when a condition is met. The condition may be one of a set of conditions, and whichever condition is met first will cause the STA to un-ban the connection profile. For example, the condition may be the expiry of a timer, known as a "timeout". When configuring the duration of the timeout, one balances two competing considerations: increased STA power savings (for longer durations), and faster ability to reconnect to a WLAN (for shorter durations). The duration of the timeout may be, for example, in the range of 1 minute to 15 minutes, or in the range of 2 minutes to 10 minutes, or approximately 5 minutes, or any other duration. In another example, the condition may be the editing of the banned connection profile. In a further example, detection by the STA of user input indicative of an explicit request to connect to a banned connection profile may cause the STA to un-ban the banned connection profile. In yet another example, the STA may un-ban a banned connection profile if the STA determines that it is no longer in the coverage area of an AP supporting a WLAN with the network name of the banned connection profile. In a further example, turning the WLAN radio off may cause the STA to un-ban all banned connection profiles. In yet another example, detection by the STA of user input that is indicative of selection of a banned connection profile from results of a discovery scan may cause the STA to un-ban the selected banned connection profile.

The STA may optionally generate a notification that a connection profile has been banned, with the notification to be displayed or provided via any suitable user output component of the STA to a user of the STA. Examples for such notifications, in which Label refers to the label assigned to the connection profile, either by the user or automatically by the STA, include: "Profile Label has temporarily been blocked from associations due to an inability to obtain an IP address"; "Profile Label has temporarily been blocked from associations due to invalid credentials"; and "Profile Label has temporarily been blocked from associations due to authentication timeouts".

When displayed as part of a list of connection profiles stored in the STA, any banned connection profile may optionally have its banned status indicated by a visual indication. Banned connection profiles may be displayed in a separate list from un-banned connection profiles.

Overview—Banning of Access Points

The STA may ignore any received communications from a banned access point. The STA refrains from transmitting any communications addressed to the unique identifier of a banned access point. In one implementation, outgoing communications are screened to block transmission of any communications addressed to the unique identifier of any banned access point. In another implementation, outgoing communications are screened to block addressing of any communications to the unique identifier of any banned access point.

In yet another implementation, the STA filters probe responses received during active scanning to remove from the scan results records for any probe responses received from any banned access point, and the STA filters beacon frames received during passive scanning to remove from the scan results records for any probe responses received from any banned access point. Banned APs will therefore not be eligible for selection as a target AP by the STA, thus preventing repeated failed authentication processes. Conditions for "unbanning" an access point are also described herein.

Suppose the mismatch in credentials is due to misconfiguration of a particular AP, and the WLAN is also supported by one or more other APs in which the credentials are not misconfigured. While the particular AP is banned, the STA will still be able to select a properly-configured AP as a target AP if the STA detects the properly-configured AP during scanning. This situation may occur in a small office/home office (SOHO) or hotspot deployment of a WLAN, where although multiple APs are configured with the same network name, the same security type and the same credentials, each AP is configured independently of the others. In an enterprise or corporate deployment of a WLAN, configuration of the APs is typically controlled centrally, and it is unlikely that a single AP in the enterprise is misconfigured. Rather, it is more common that either (i) all the APs in the enterprise are properly configured, and the authentication failure is due to a misconfiguration of the profile in the STA; or (ii) all the APs in the enterprise are identically misconfigured. If a STA were to ban the target AP in an enterprise environment after experiencing an authentication process failure with the target AP, the STA would likely experience authentication process failure with all other APs in the enterprise environment. In view of this distinction, in some implementations, the STA may react to failure of the authentication process in a SOHO or hotspot environment by banning the target AP, and may react to failure of the authentication process in an enterprise environment by banning the identified connection profile.

Overview—Suppression of Access Points

The STA will address communications to the unique identifier of a suppressed access point less often than to the unique identifier of an access point that is neither suppressed nor banned.

In one implementation, the STA occasionally filters probe responses received during active scanning to remove from the scan results records for any probe responses received from any suppressed access point, and the STA occasionally filters beacon frames received during passive scanning to remove from the scan results records for any beacon frames received from any suppressed access point. Suppressed APs will therefore be eligible for selection as a target AP by the STA less often, thus reducing the frequency of failed authentication processes. Conditions for "un-suppressing" an access point are described herein. Conditions for converting the status of an access point from suppressed to banned are described herein.

In some implementations, the STA may react to failure of the authentication process in a SOHO or hotspot environment by suppressing the target AP, and may react to failure of the authentication process in an enterprise environment by banning the identified connection profile. In other implementations, the STA may react to the failure of the authentication process in a SOHO or hotspot environment by banning the target AP if the cause of the failure is 'invalid credentials' and by suppressing the target AP if the cause of failure is something other than 'invalid credentials', and may react to failure of the authentication process in an enterprise environment by banning the identified connection profile. As described in more detail below with respect to FIG. 17, a suppressed AP may be banned (and simultaneously unsuppressed) if there are too many authentication failures involving the suppressed AP.

General Remarks Relating to Flowchart Illustrations and Block Diagrams

Some of these techniques are described herein with reference to flowchart illustrations and/or block diagrams of methods, apparatus (systems) and computer program products. It will be understood that each block of the flowchart illustration and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create means for implementing the functions or actions specified in the flowchart illustration and/or block diagram block or blocks.

These computer program instructions may also be stored in a physical computer-readable medium that can direct a computer or other programmable data processing apparatus to function in a particular manner, such that the instructions stored in the computer-readable medium produce an article of manufacture including instruction means which implement the functions or actions specified in the flowchart illustration and/or block diagram block or blocks. Computer programs implementing the techniques described herein can be distributed to users on a distribution medium such as a floppy disk, CD-ROM, or DVD, or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computing to act in accordance with the methods described herein. All these operations are well-known to those skilled in the art of computer systems.

Each block of the flowchart illustrations and/or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending on the functionality involved. Each block of the flowchart illustration and/or block diagrams, and combinations of blocks in the flowchart illustrations and/or block diagrams, can be implemented by special purpose hardware-based systems that perform the specified functions or actions, or by combinations of special purpose hardware and computer instructions.

Description of Environment

FIG. 1 is an illustration of an example wireless communication system 100. Wireless communication system 100 comprises a STA 102 within the coverage area of an AP 104 that is connected to a network 106. In this example, an authorization server 108 and a DHCP server 110 are also connected to the network 106. Optionally, another AP 114 is connected to network 106 and STA 102 is within the coverage area of AP 114. AP 104 and AP 114 may be part of the same WLAN, in which case they may be connected via a distribution system (not shown). Alternatively, AP 104 and AP 114 may belong to different WLANs.

For example, wireless communication system 100 may be an environment in which there are two or more APs configured with the same network name (e.g., "Work"), the same security type (e.g. PSK) and the same credentials (e.g. "123456"). This situation is common, for example, in enterprise or corporate deployments of a wireless local area network. If STA 102 stores a connection profile provisioned with the same network name (e.g., "Work") and the same security type (e.g. PSK) as the APs but with different credentials (e.g. "632145"), then STA 102 will consistently experience authentication process failures while moving in that environment.

In another example, wireless communication system 100 is an environment in which there is a single AP configured with a network name (e.g., "Home"), a security type (e.g. PSK), and credentials (e.g., "123456"). If STA 102 stores a connection profile provisioned with the same network name (e.g., "Home") and the same security type (e.g. PSK) as the APs but with different credentials (e.g., "987654"), then STA 102 will consistently experience authentication process failures while moving in that environment.

In yet another example, wireless communication system 100 is an environment in which there are two or more APs configured with the same network name (e.g., "Home"), the same security type (e.g. PSK), and different credentials (e.g., AP 104 is configured with "123456", and AP 114 is configured with "654321"). This situation is common, for example, in home, street and hotspot deployments of wireless local area networks. If STA 102 stores a connection profile provisioned with the same network name (e.g., "Home") and the same security type (e.g. PSK) as the APs but with the credentials of only one of the APs, (e.g., "123456"), then STA 102 will experience authentication process failures if AP 114 is selected as the target AP.

Detailed Description of Banning of Connection Profiles

Figure 2:
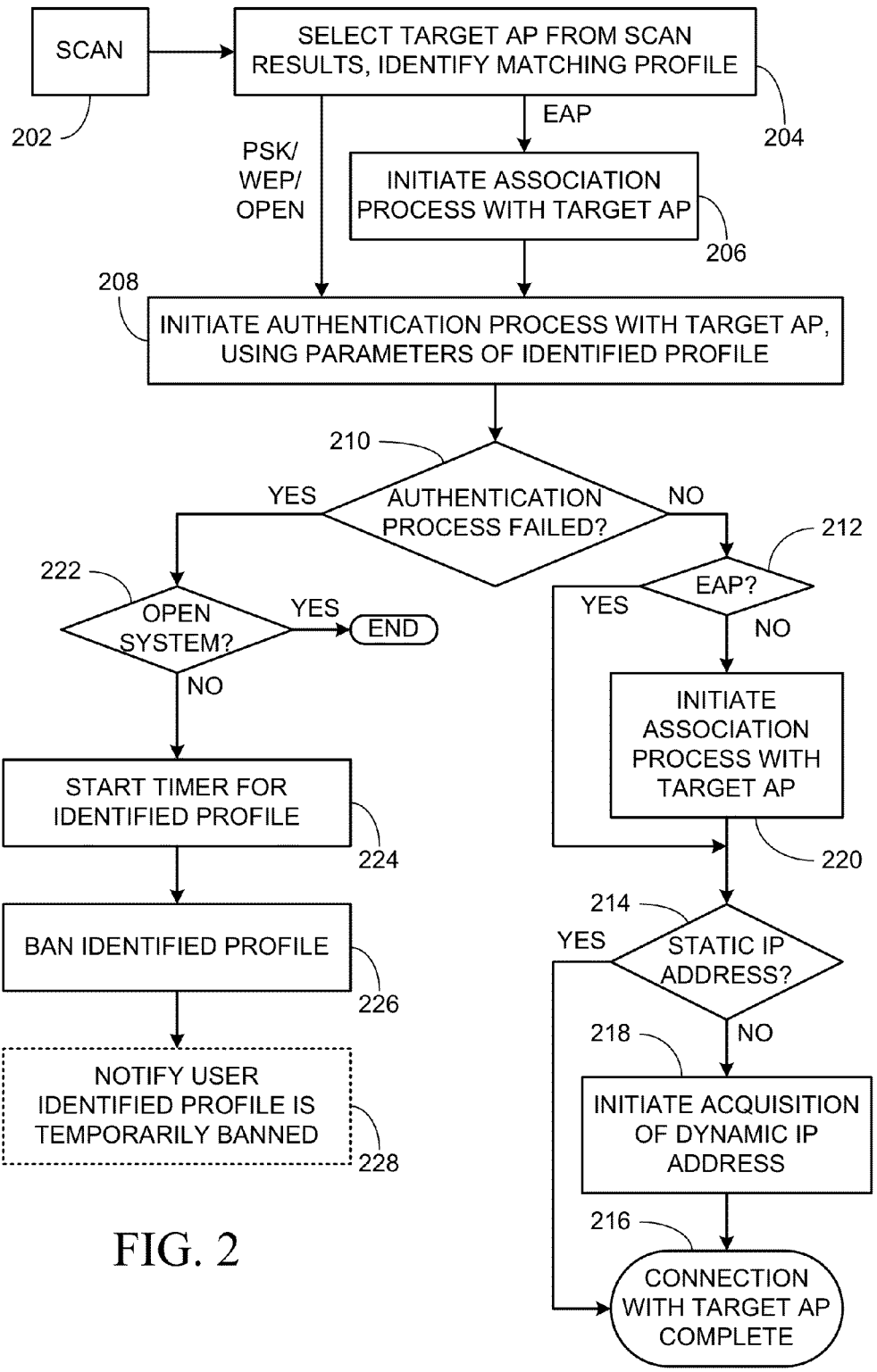
FIG. 2 is a flowchart illustrating an example of a method of joining a wireless local area network, the method to be performed by a mobile station, in which a connection profile is temporarily banned if an authentication process between the mobile station and a target access point fails.

FIG. 2 is a flowchart illustrating an example of a method of joining a wireless local area network, the method to be performed by a mobile station, for example, STA 102, in which a connection profile is temporarily banned if an authentication process between the mobile station and a target access point fails.

At 202, the STA scans, using passive scanning or active scanning or any combination thereof, to identify APs in whose coverage area the STA is currently located.

At 204, the STA selects a target AP from the scan results, thereby identifying a matching connection profile. The target AP may be automatically selected by the STA without user intervention. Alternatively, selection of the target AP may be indicated to the STA through activation by the user of the STA of a user input component of the STA.

Selecting a target AP may involve comparing the scan results to one or more of the connection profiles stored in the STA. A target AP whose beacon frame or probe response is in the scan results is considered a match to a particular connection profile if the following network details of the particular connection profile and the network details of the beacon frame or probe response are identical: network name, security type, and encryption type.

As noted above, if the security type of the target AP and the identified connection profile is "EAP", the STA proceeds to initiate at 206 an association process with the target AP.

This typically involves the STA sending an association request that is addressed to a unique identifier of the target AP. Assuming that the association process is successful, the STA then proceeds to initiate at 208 an authentication process with the target AP, using parameters of the identified profile that are relevant for the authentication method being used in the authentication process. If the security type is "EAP", the target AP will act as an intermediary between the STA and an authorization server, for example, authentication server 108.

If the security type of the target AP and the identified connection profile is "Open System" or a Shared Key Authentication such as "WEP" or "PSK", then authentication precedes association and after selecting a target AP at 204, the method proceeds directly to 208 to initiate an authentication process with the target AP, using parameters of the identified profile that are relevant for the authentication method being used in the authentication process.

Initiation of an authentication process typically involves the STA sending an authentication request that is addressed to a unique identifier of the target AP. The credentials stored in the identified connection profile are transmitted by the STA in a manner receivable by the target AP.

If the authentication process has not failed, as checked at 210, and if the security type is "EAP", as checked at 212, and if the STA has a static IP address, as checked at 214, then the connection of the STA and the target AP is complete, as indicated at 216.

If the authentication process has not failed, as checked at 210, and if the security type is "EAP", as checked at 212, and if the STA does not have a static IP address, as checked at 214, then the STA initiates at 218 with the target AP a process of dynamic IP address acquisition. As noted above, the process of dynamic IP address acquisition may involve a DHCP server, for example, DHCP server 110. Upon successful acquisition by the STA of a dynamic IP address, the connection of the STA and the target AP is complete, as indicated at 216.

If the authentication process has not failed, as checked at 210, and if the security type is not "EAP", as checked at 212, then the STA initiates at 220 an association process with the target AP. This typically involves the STA sending an association request that is addressed to a unique identifier of the target AP. Assuming that the association process is successful, the next actions then depend upon whether the STA has a static IP address, as described hereinabove with respect to 214, 216 and 218.

There are different reasons for the authentication process to fail. For example, if the security type is "Open System", the authentication process will fail if the specific STA has been forbidden by the target AP to connect to it. In another example, if the credentials supplied by the STA do not match the expected credentials, then the target AP (or authentication server) will send an 'invalid credentials' error message. In a further example, if there is a network error, for example, a problem with an authentication server, then the authentication process will fail to successfully complete before expiry of an authentication timer. If the authentication process has failed, as checked at 210, and the security type is not "Open System", as checked at 222, the STA starts a timer for the identified connection profile at 224 and bans the identified connection profile at 226.

Banning a connection profile may be implemented in the STA any suitable manner. For example, a connection profile may include a field which is set to a first value if the connection profile is not banned and set to a second value if the connection profile is banned. In another example, an indication of the connection profile, such as its network name, may be added to a list when the connection profile is banned, and may be removed from the list when the connection profile is un-banned.

The STA may at 228 optionally notify a user of the STA that the identified profile has been temporarily banned. This has been described in more detail hereinabove.

Figure 3:
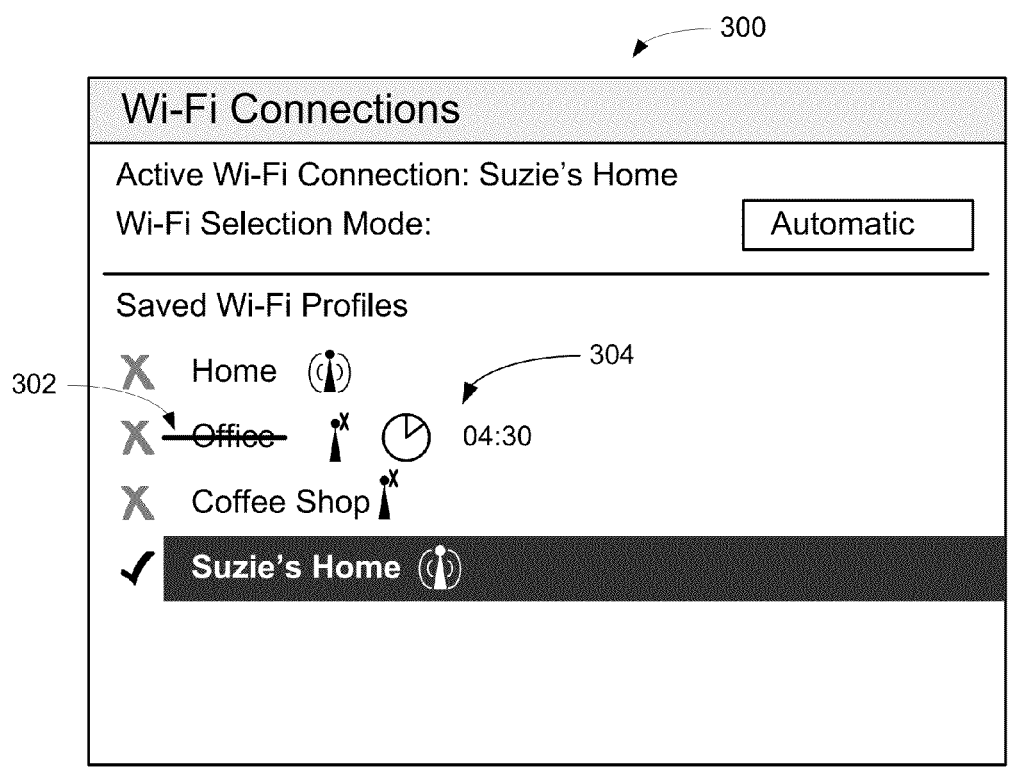
FIG. 3 is an illustration of an example screenshot listing connection profiles stored in a mobile station, in which a temporarily banned connection profile is identified by a visual indication.

When displayed as part of a list of connection profiles stored in the STA, any banned connection profile may optionally have its banned status indicated by a visual indication. FIG. 3 is an illustration of an example screenshot 300 listing connection profiles stored in a mobile station, for example, STA 102, in which a temporarily banned connection profile, labeled "Office", is identified by a visual indication 302, which in this example is a line through the label. Alternatively or additionally, a visual indication 304 is used to identify the temporarily banned connection profile, where the visual indication 304 is a timer showing how much time (in minutes and seconds) is left before the profile labeled "Office" is unbanned. In other implementations, the time may show how long the profile labeled "Office" has been banned.

Figure 4:
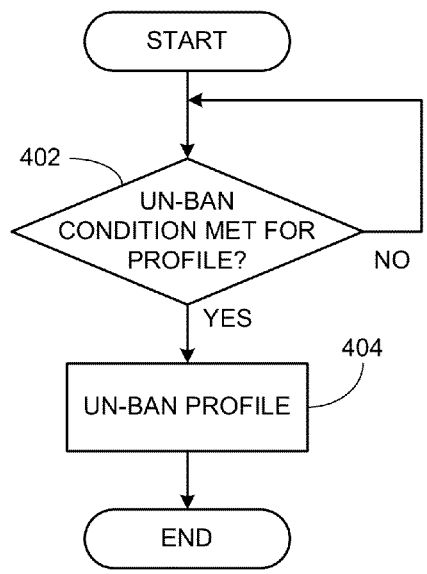
FIG. 4 is a flowchart illustrating an example method to be performed by a mobile station for un-banning a connection profile.
Figures 1, 4:
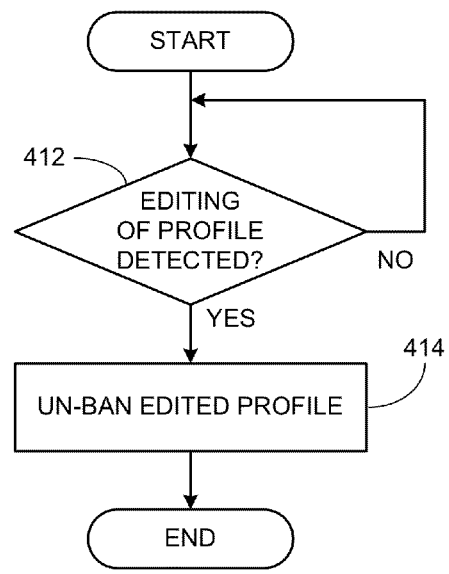
Figures 2, 4:
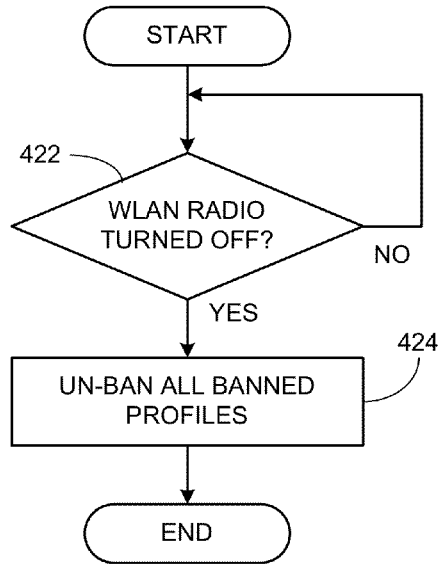
Figures 3, 4:
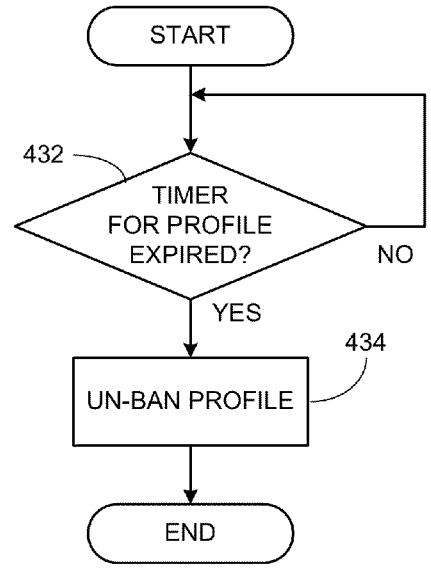
Figure 4:
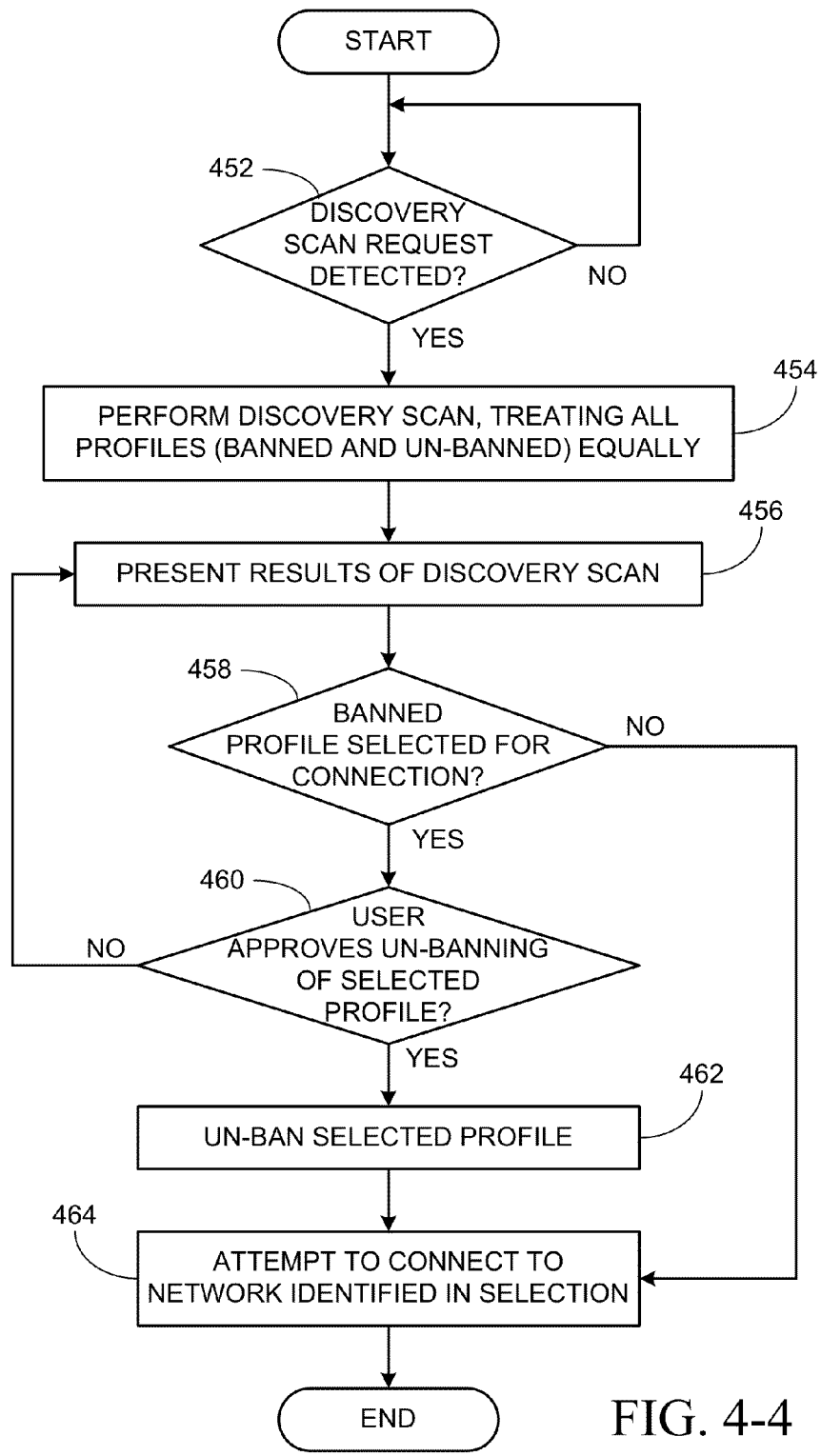

FIG. 4 is a flowchart illustrating an example method to be performed by a mobile station, for example, STA 102, for un-banning a banned connection profile. Upon detecting at 402 that an un-ban condition has been met for a particular banned connection profile, the STA proceeds at 404 to un-ban the particular banned connection profile. Examples of un-ban conditions have been described hereinabove. Different conditions or different combinations of conditions may be used in different implementations.

FIGS. 4-1, 4-2 and 4-3 are flowcharts illustrating specific example methods to be performed by a mobile station, for example, STA 102, for un-banning one or more connection profiles. In FIG. 4-1, upon detecting at 412 that a particular banned connection profile has been edited, the STA proceeds at 414 to un-ban the edited connection profile. In FIG. 4-2, upon detecting at 422 that a WLAN radio of the STA has been turned off, the STA proceeds at 424 to un-ban all banned connection profiles. In FIG. 4-3, upon detecting at 432 that a timer set for a particular banned connection profile (see, for example, the timer started at 220 in FIG. 2) has expired, the STA proceeds at 434 to un-ban the connection profile for which the timer has expired.

In FIG. 4-4, upon detecting at 452 input indicative of a request from a user to conduct a discovery scan, the STA proceeds at 454 to conduct the discovery scan in a manner that treats all connection profiles equally, regardless of their status as banned or unbanned. No connection profiles will be excluded from a user-requested network scan. At 456, the STA presents the results of the discovery scan and a user may select one of the results for selection. In one implementation, only unbanned connection profiles found during the discovery scan are presented. In another implementation, all connection profiles found during the discovery scan are presented. In a further implementation, all connection profiles found during the discovery scan are presented, with banned connection profiles distinguished from the unbanned connection profiles. In either of the latter two implementations, if the user's selection is of a banned connection profile, as checked at 458, then the STA may prompt for approval to un-ban the selected connection profile. If user input received at the STA is indicative of such approval, as checked at 460, the STA may proceed at 462 to un-ban the selected connection profile and to attempt at 464 to connect to the wireless local area network identified in the selected connection profile. If the user's selection is not a banned connection profile, the STA may proceed directly at 464 to attempt to connect to the wireless local area network identified in the selection. If the user input received at the STA following prompting for approval to un-ban a selected connection profile is indicative of lack of such approval, the method may return to the presentation of the results at 456.

Figure 5:
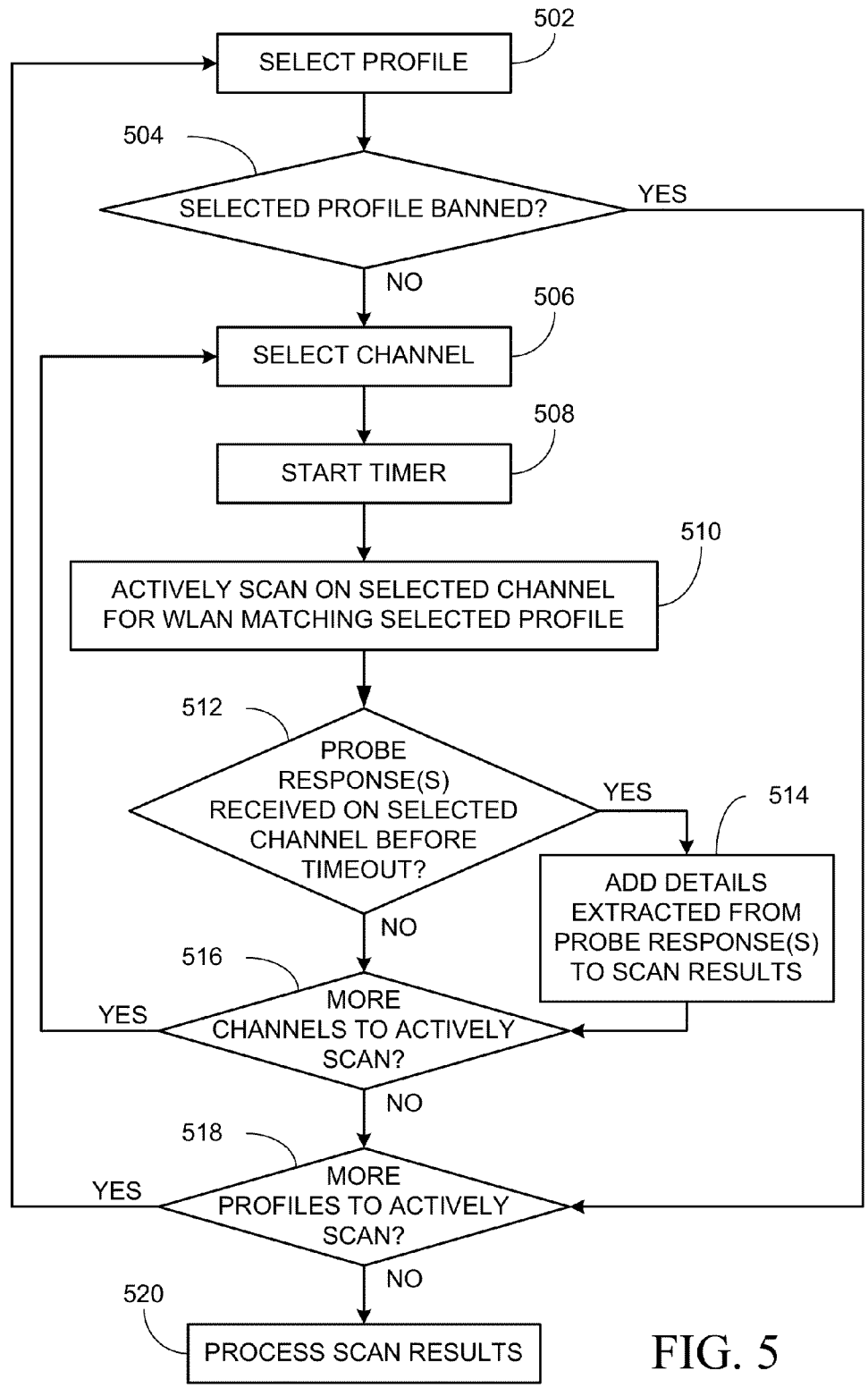
FIG. 5 is a flowchart illustrating an example of a method for active scanning that takes into account whether a profile is banned, the method to be performed by a mobile station.

As mentioned above, banning a connection profile affects how subsequent scans—other than discovery scans—and connection attempts are handled. FIG. 5 is a flowchart illustrating an example of a method for active scanning that takes into account whether a profile is banned, the method to be performed by a mobile station, for example, STA 102. Variations on how active scanning is conducted by the STA are also contemplated, and the method illustrated in FIG. 5 is merely one example. The method illustrated in FIG. 5 does not apply to any active scanning that is performed as part of a discovery scan.

At 502, the STA selects a connection profile, for example, from among the connection profiles stored in its memory. The STA determines at 504 whether the selected connection profile is banned, for example, by sampling the value of the field of the profile mentioned hereinabove, or by checking whether the selected connection profile is included in the list mentioned hereinabove.

If the selected connection profile is not banned, the STA proceeds to select at 506 a channel upon which to do the active scanning. The STA starts a timer at 508, and the STA then actively scans at 510 on the selected channel for a wireless local area network having the same network name as that of the selected connection profile. This typically involves the STA transmitting a probe request specifying the network name of the selected connection profile on the selected channel. The STA then waits to see if any probe responses are received on the selected channel before the timer started at 508 has a timeout. Only APs configured with the network name specified in the probe request and configured to operate on the selected channel will respond to the probe request with a probe response.

If the STA has received one or more probe responses on the selected channel before the timeout, as checked at 512, the STA adds at 514 to the scan results one or more records containing details extracted from the received one or more probe responses, and then proceeds to check at 516 whether there are any other channels to actively scan. If so, the method proceeds to 506 where the STA selects another channel. If there are not any other channels to actively scan, the method proceeds to 518 where the STA checks whether any other connection profiles are to be actively scanned.

If there is at least one more connection profile to be actively scanned, the method continues to 502 where the STA selects another connection profile. If there are no other connection profiles to be actively scanned, then the STA processes at 520 the scan results of the active scanning For example, processing the scan results may include automatically selecting a target AP from the scan results without user intervention. In another example, processing the scan results may include displaying, via a display of the STA, a list of available networks gleaned from the scan results, so that a user of the STA can select a target AP from the displayed list.

If no probe responses have been received by the STA before the timeout, as checked at 512, the STA then proceeds directly to check at 516 whether there are any other channels to actively scan.

If the selected profile is banned, as checked at 504, the STA proceeds directly to check at 518 whether any other connection profiles are to be actively scanned.

Figure 6:
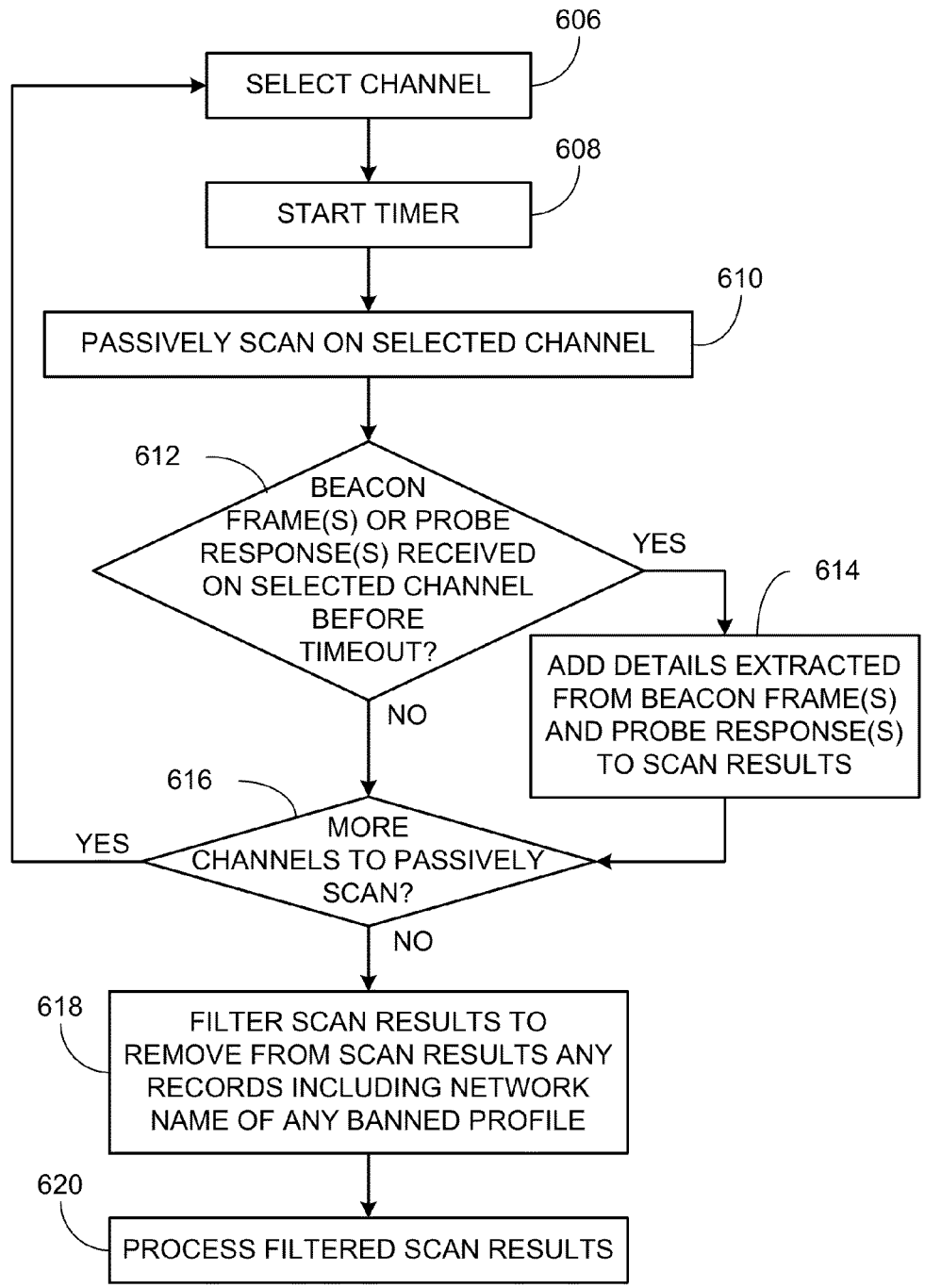
FIG. 6 is a flowchart illustrating an example of a method for passive scanning in the situation where at least one profile is banned, the method to be performed by a mobile station.

As mentioned above, banning a connection profile affects how subsequent scans—other than discovery scans—and connection attempts are handled. FIG. 6 is a flowchart illustrating an example of a method for passive scanning in the situation where at least one profile is banned, the method to be performed by a mobile station, for example, STA 102. Variations on how passive scanning is conducted by the STA are also contemplated, and the method illustrated in FIG. 6 is merely one example. The method illustrated in FIG. 6 does not apply to any passive scanning that is performed as part of a discovery scan.

At 606, the STA selects a channel upon which to do the passive scanning. The STA starts a timer at 608, and the STA then passively scans at 610 on the selected channel. This typically involves the STA listening for beacon frames transmitted by APs on the selected channel. The STA then waits to see if any beacon frames are received on the selected channel before the timer started at 608 has a timeout. Only APs configured to operate on the selected channel will transmit beacon frames on the selected channel. APs configured to hide the network name will transmit beacon frames in which no network name is advertised. The STA may also receive one or more probe responses on the selected channel that are addressed to a different STA.

If the STA has received one or more beacon frames or probe responses or both on the selected channel before the timeout, as checked at 612, the STA adds at 614 to the scan results one or more records containing details extracted from the received one or more beacon frames or probe responses or both, and then proceeds to check at 616 whether there are any other channels to passively scan. If so, the method proceeds to 606 where the STA selects another channel.

If there are not any other channels to actively scan, the method proceeds to 618 where the STA filters the scan results to remove from the scan results any records including the network name of any banned profile. To filter the scan results, the STA may sample the value of the field of the connection profile mentioned hereinabove, or may check whether the selected connection profile is included in the list mentioned hereinabove. In a modified method for passive scanning, the filtering to remove records including the network name of any banned profile may occur at 614, for the selected channel, thus eliminating the need to filter the scan results after all channels to be passively scanned have been passively scanned.

After filtering the scan results, the STA processes at 620 the filtered scan results of the passive scanning. For example, processing the filtered scan results may include automatically selecting a target AP from the filtered scan results without user intervention. In another example, processing the filtered scan results may include displaying, via a display of the STA, a list of available networks gleaned from the filtered scan results, so that a user of the STA can select a target AP from the displayed list.

The results of active scanning and the filtered results of passive scanning may be combined, and then processing as described above with respect to 520 and 620 may be performed by the STA on the combined results.

Figure 7:
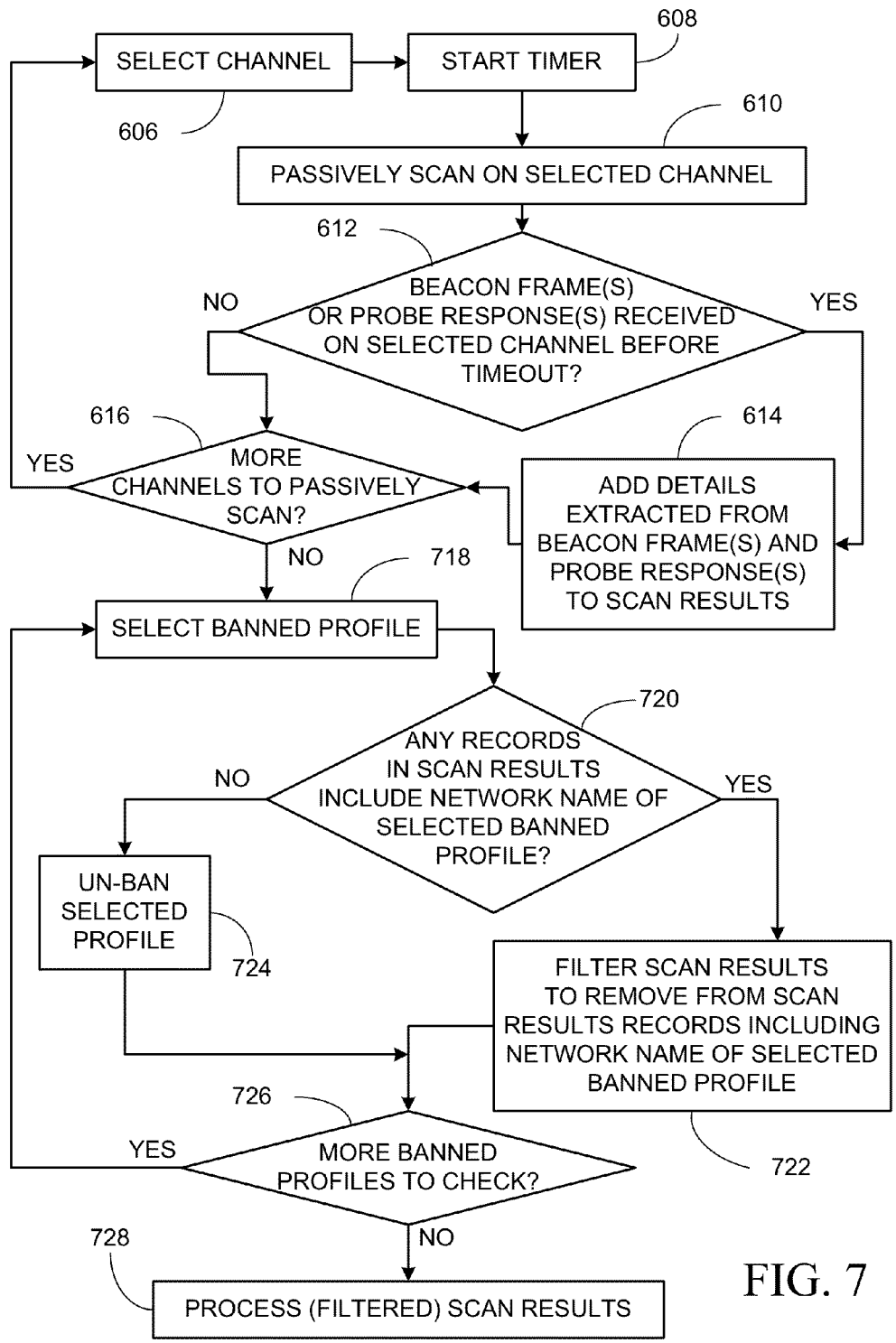
FIG. 7 is a flowchart illustrating another example of a method for passive scanning in the situation where at least one profile is banned, the method to be performed by a mobile station.

FIG. 7 is a flowchart illustrating another example of a method for passive scanning in the situation where at least one profile is banned, the method to be performed by a mobile station, for example, STA 102. Variations on how passive scanning is conducted by the STA are also contemplated, and the method illustrated in FIG. 7 is merely one example. The method illustrated in FIG. 7 does not apply to any passive scanning that is performed as part of a discovery scan.

The method illustrated in FIG. 7 is similar to the method illustrated in FIG. 6, as indicated by the repeated use of reference numerals used in FIG. 6. The description of FIG. 6 with respect to those reference numerals is applicable also to the method illustrated in FIG. 7, except as noted below.

If, as checked at 616, the STA determines that there are not any other channels to actively scan, the STA then checks the records in the scan results against the banned connection profiles, one banned connection profile at a time.

At 718, the STA selects one of the banned connection profiles. At 720, the STA checks whether any of the records in the scan results include the network name of the selected banned connection profile. If so, then STA filters at 722 the scan results to remove those records from the scan results. If not, then this is an indication that the STA is no longer in the coverage area of any AP configured with the network name of the selected banned connection profile, and the STA therefore un-bans at 724 the selected banned connection profile. There is a risk the AP configured with the network name of the selected banned connection profile hides the network name and therefore the STA, unaware that it actually is in the coverage area of the AP, will un-ban the selected banned connection profile.

Following the filtering at 722 of the scan results or the un-banning at 724 of the selected banned connection profile, the STA checks at 726 whether there are any other banned profiles to check against the scan results. If so, the method proceeds to 718 with the selection of another banned connection profile. If not, the STA processes at 728 the filtered scan results of the passive scanning. For example, processing the filtered scan results may include automatically selecting a target AP from the filtered scan results without user intervention. In another example, processing the filtered scan results may include displaying, via a display of the STA, a list of available networks gleaned from the filtered scan results, so that a user of the STA can select a target AP from the displayed list.

The results of active scanning and the filtered results of passive scanning may be combined, and then processing as described above with respect to 520 and 728 may be performed by the STA on the combined results.

Detailed Description of Banning of Access Points

Figure 8:
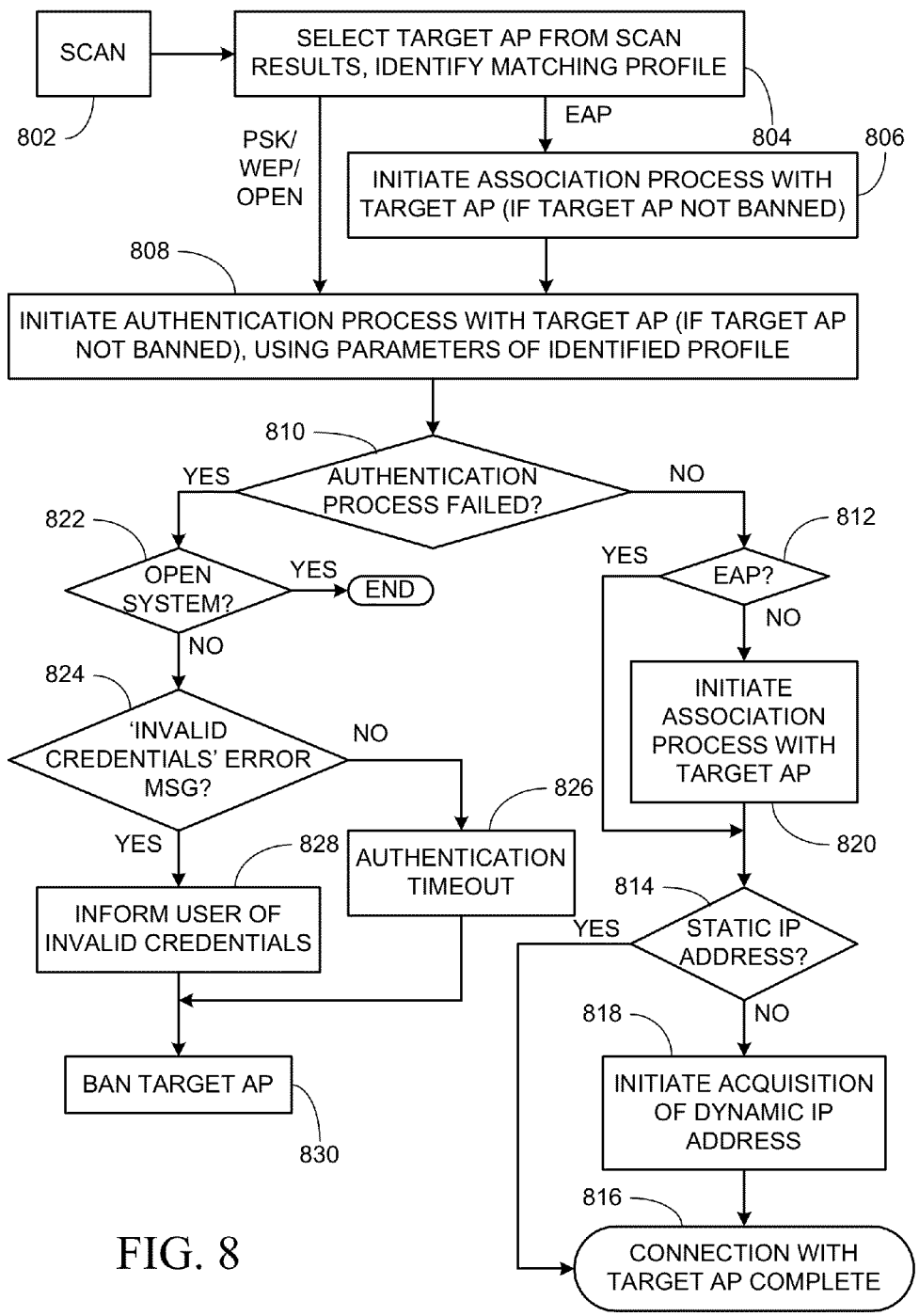
FIG. 8 is a flowchart illustrating an example of a method of joining a wireless local area network, the method to be performed by a mobile station, in which a target access point is banned if an authentication process between the mobile station and the target access point fails.

FIG. 8 is a flowchart illustrating an example of a method of joining a wireless local area network, the method to be performed by a mobile station, for example, STA 102, in which a target access point is banned if an authentication process between the mobile station and the target access point fails.

At 802, the STA scans, using passive scanning or active scanning or any combination thereof, to identify APs in whose coverage area the STA is currently located.

At 804, the STA selects a target AP from the scan results, thereby identifying a matching connection profile. The target AP may be automatically selected by the STA without user intervention. Alternatively, selection of the target AP may be indicated to the STA through activation by the user of the STA of a user input component of the STA.

Selecting a target AP may involve comparing the scan results to one or more of the connection profiles stored in the STA. A target AP whose beacon frame or probe response is in the scan results is considered a match to a particular connection profile if the following network details of the particular connection profile and the network details of the beacon frame or probe response are identical: network name, security type, and encryption type.

A banned AP will not be selected as a target AP. This restriction may be implemented by filtering banned APs from the scan results prior to selection of a target AP. Alternatively, or additionally, this restriction may be implemented in the process of selecting a target AP.

As noted above, if the security type of the target AP and the identified connection profile is "EAP", the STA proceeds to initiate at 806 an association process with the target AP, provided that the target AP is not banned. This typically involves the STA sending an association request that is addressed to a unique identifier of the target AP. Since the STA refrains from sending communications addressed to the unique identifier of a banned AP, the STA will not initiate an association process with a banned AP. Assuming that the association process is successful, the STA then proceeds to initiate at 808 an authentication process with the target AP, provided that the target AP is not banned, using parameters of the identified profile that are relevant for the authentication method being used in the authentication process. If the security type is "EAP", the target AP will act as an intermediary between the STA and an authorization server, for example, authentication server 108.

If the security type of the target AP and the identified connection profile is "Open System" or a Shared Key Authentication such as "WEP" or "PSK", then authentication precedes association and after selecting a target AP at 804, the method proceeds directly to 808 to initiate an authentication process with the target AP, provided that the target AP is not banned, using parameters of the identified profile that are relevant for the authentication method being used.

Initiation of an authentication process typically involves the STA sending an authentication request that is addressed to a unique identifier of the target AP. The credentials stored in the identified connection profile are transmitted by the STA in a manner receivable by the target AP. Since the STA refrains from sending communications addressed to the unique identifier of a banned AP, the STA will not initiate an authentication process with a banned AP.

If the authentication process has not failed, as checked at 810, and if the security type is "EAP", as checked at 812, and if the STA has a static IP address, as checked at 814, then the connection of the STA and the target AP is complete, as indicated at 816.

If the authentication process has not failed, as checked at 810, and if the security type is "EAP", as checked at 812, and if the STA does not have a static IP address, as checked at 814, then the STA initiates at 818 with the target AP a process of dynamic IP address acquisition. As noted above, the process of dynamic IP address acquisition may involve a DHCP server, for example, DHCP server 110. Upon successful acquisition by the STA of a dynamic IP address, the connection of the STA and the target AP is complete, as indicated at 816.

If the authentication process has not failed, as checked at 810, and if the security type is not "EAP", as checked at 812, then the STA initiates at 820 an association process with the target AP, provided that the target AP is not banned. This typically involves the STA sending an association request that is addressed to a unique identifier of the target AP. Assuming that the association process is successful, the next actions then depend upon whether the STA has a static IP address, as described hereinabove with respect to 814, 816 and 818.

If the authentication process has failed, as checked at 810, and the security type is not "Open System", as checked at 822, this has been determined by the STA either through receipt by the STA of an "invalid credentials" error message from the target AP, as checked at 824, or by an authentication timeout, as determined at 826. If the STA has received an "invalid credentials" error message, the user is informed of this error at 828, for example, by generation and display of an appropriate notification. Regardless of the cause for the authentication process failure, the STA bans the target AP at 830.

As explained above, a problem with an authentication server may lead to an authentication timeout. If a subsequent attempt by the STA to authenticate with the target AP involves the redirection of the authentication request to a different authentication server, the subsequent attempt may succeed. Therefore, in a modified version of the method illustrated in FIG. 8, the STA bans the target AP only if the cause for authentication process failure is invalid credentials, and does not ban the target AP if the cause for authentication process failure is authentication timeout.

Banning an access point may be implemented in the STA in any suitable manner. For example, a unique identifier of the access point, such as its MAC address, may be added to a ban list when the access point is banned, and may be removed from the ban list when the access point is un-banned.

Figures 1, 9:
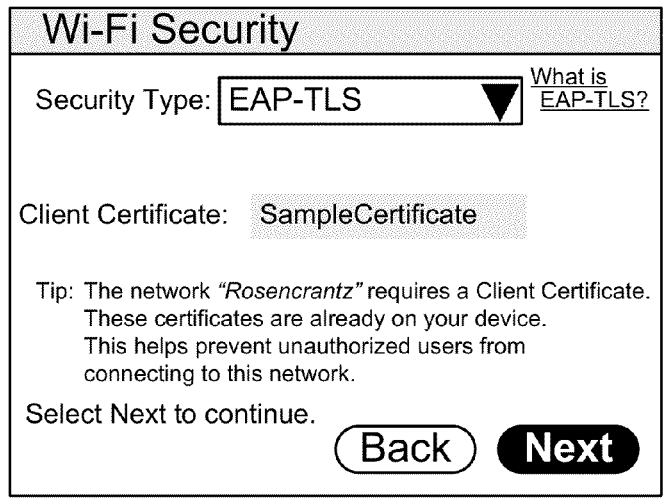
Figures 2, 9:
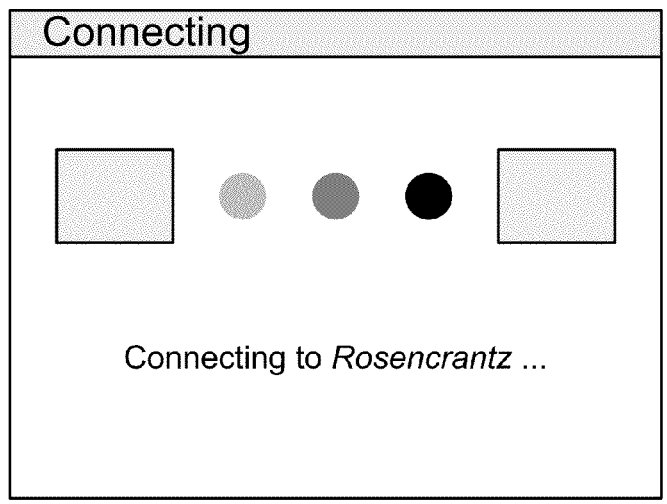
Figures 3, 9:
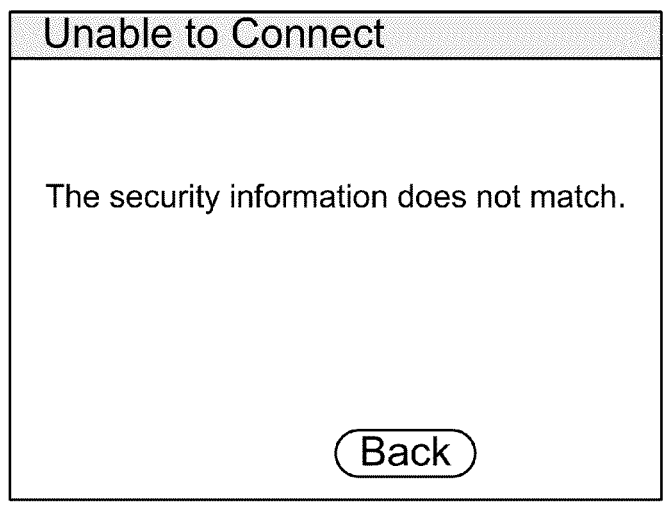

FIGS. 9-1, 9-2 and 9-3 are illustrations of example screenshots displayed at a mobile station, for example, STA 102. FIG. 9-1 illustrates a screenshot for selection of a security type to be saved in a particular connection protocol. FIG. 9-2 illustrates a screenshot displayed when the STA is attempting to connect to a wireless local area network with the network name Rosencrantz. FIG. 9-3 illustrates a screenshot displayed when the authentication has failed because credentials supplied by the mobile station to the target access point for the authentication process do not match expected credentials.

Figure 10:
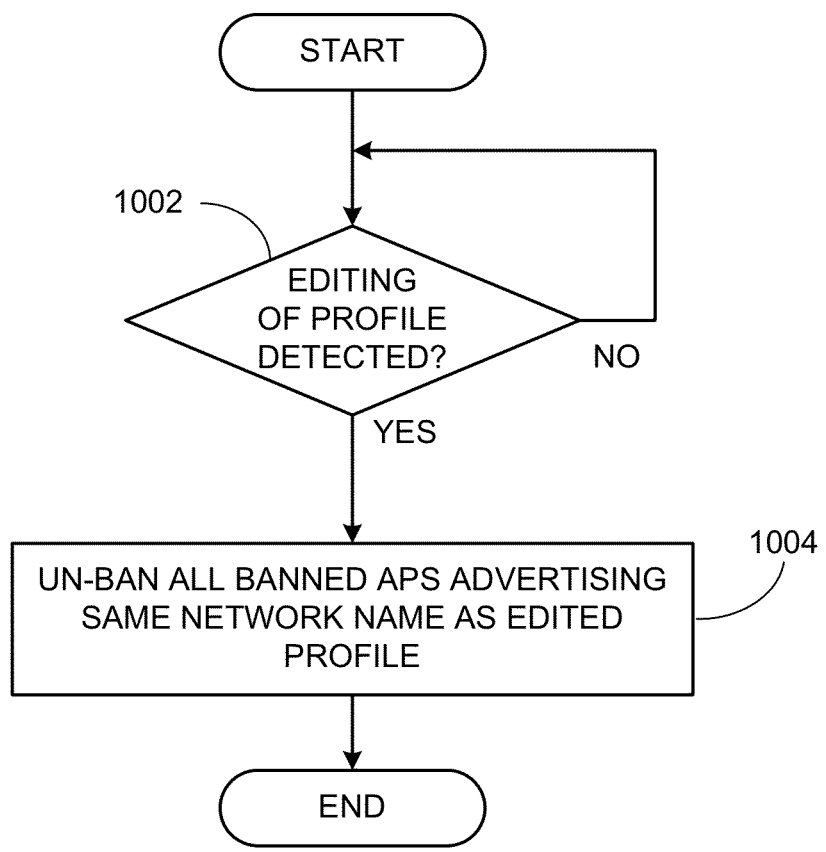
FIG. 10 is a flowchart illustrating an example method to be performed by a mobile station for un-banning an access point.

FIG. 10 is a flowchart illustrating an example method to be performed by a mobile station, for example, STA 102, for un-banning an access point. Upon detecting at 1002 that a connection profile has been edited, the STA proceeds at 1004 to un-ban all banned APs advertising the same network name as that of the edited connection profile. For example, if banning APs is implemented in the STA using a ban list as described above, each time a unique identifier of an AP is added to the ban list, a copy of the record of extracted details, including the network name, is associated in the ban list with the unique identifier. The identification of banned APs having a particular network name is therefore straightforward.

Figure 11:
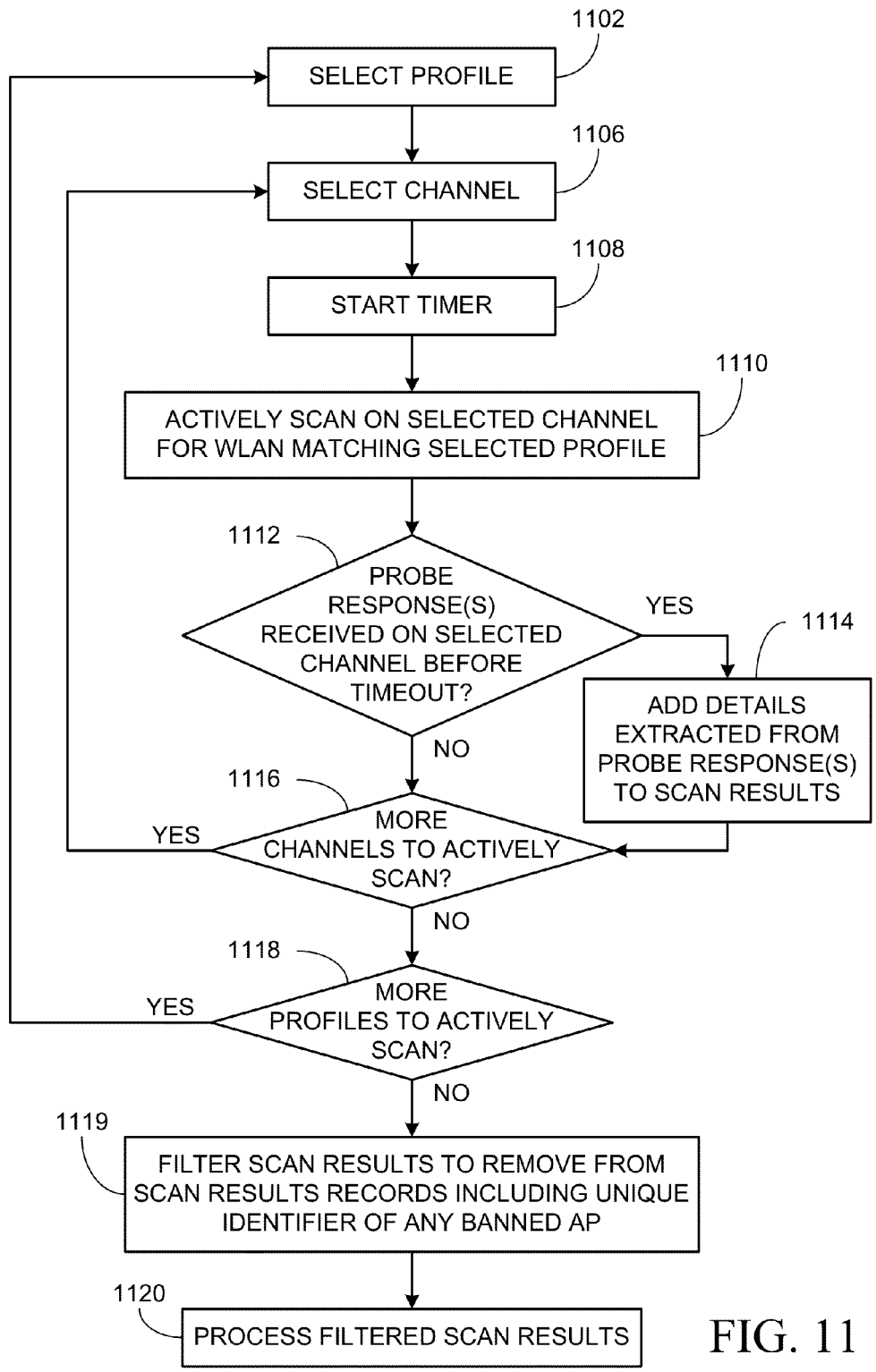
FIG. 11 is a flowchart illustrating an example of a method for active scanning that takes into account whether an access point is banned, the method to be performed by a mobile station.

As mentioned above, banning an access point affects how subsequent scans and connection attempts are handled. FIG. 11 is a flowchart illustrating an example of a method for active scanning that takes into account whether an access point is banned, the method to be performed by a mobile station, for example, STA 102. Variations on how active scanning is conducted by the STA are also contemplated, and the method illustrated in FIG. 11 is merely one example.

At 1102, the STA selects a connection profile, for example, from among the connection profiles stored in its memory. The STA proceeds to select at 1106 a channel upon which to do the active scanning. The STA starts a timer at 1108, and the STA then actively scans at 1110 on the selected channel for a wireless local area network having the same network name as that of the selected connection profile. This typically involves the STA transmitting a probe request specifying the network name of the selected connection profile on the selected channel. The STA then waits to see if any probe responses are received on the selected channel before the timer started at 1108 has a timeout. Only APs configured with the network name specified in the probe request and configured to operate on the selected channel will respond to the probe request with a probe response.

If the STA has received one or more probe responses on the selected channel before the timeout, as checked at 1112, the STA adds at 1114 to the scan results one or more records containing details extracted from the received one or more probe responses, and then proceeds to check at 1116 whether there are any other channels to actively scan. If so, the method proceeds to 1106 where the STA selects another channel. If there are not any other channels to actively scan, the method proceeds to 1118 where the STA checks whether any other connection profiles are to be actively scanned.

If there is at least one more connection profile to be actively scanned, the method continues to 1102 where the STA selects another connection profile. If there are no other connection profiles to be actively scanned, then the STA filters the scan results of the active scanning at 1119 to remove from the scan results any records including the unique identifier of any banned AP. For example, if the STA maintains a list of MAC addresses of banned APs, the STA can compare at 1119 the MAC addresses in the records to the MAC addresses in the list. In a modified method for active scanning, the filtering to remove records including the unique identifier of any banned AP may occur at 1114, for the selected channel, instead of at 1119.

After filtering the scan results, the STA processes at 1120 the filtered scan results of the active scanning. For example, processing the filtered scan results may include automatically selecting a target AP from the filtered scan results without user intervention. In another example, processing the filtered scan results may include displaying, via a display of the STA, a list of available networks gleaned from the filtered scan results, so that a user of the STA can select a target AP from the displayed list.

If no probe responses have been received by the STA before the timeout, as checked at 1112, the STA then proceeds directly to check at 1116 whether there are any other channels to actively scan.

Figure 12:
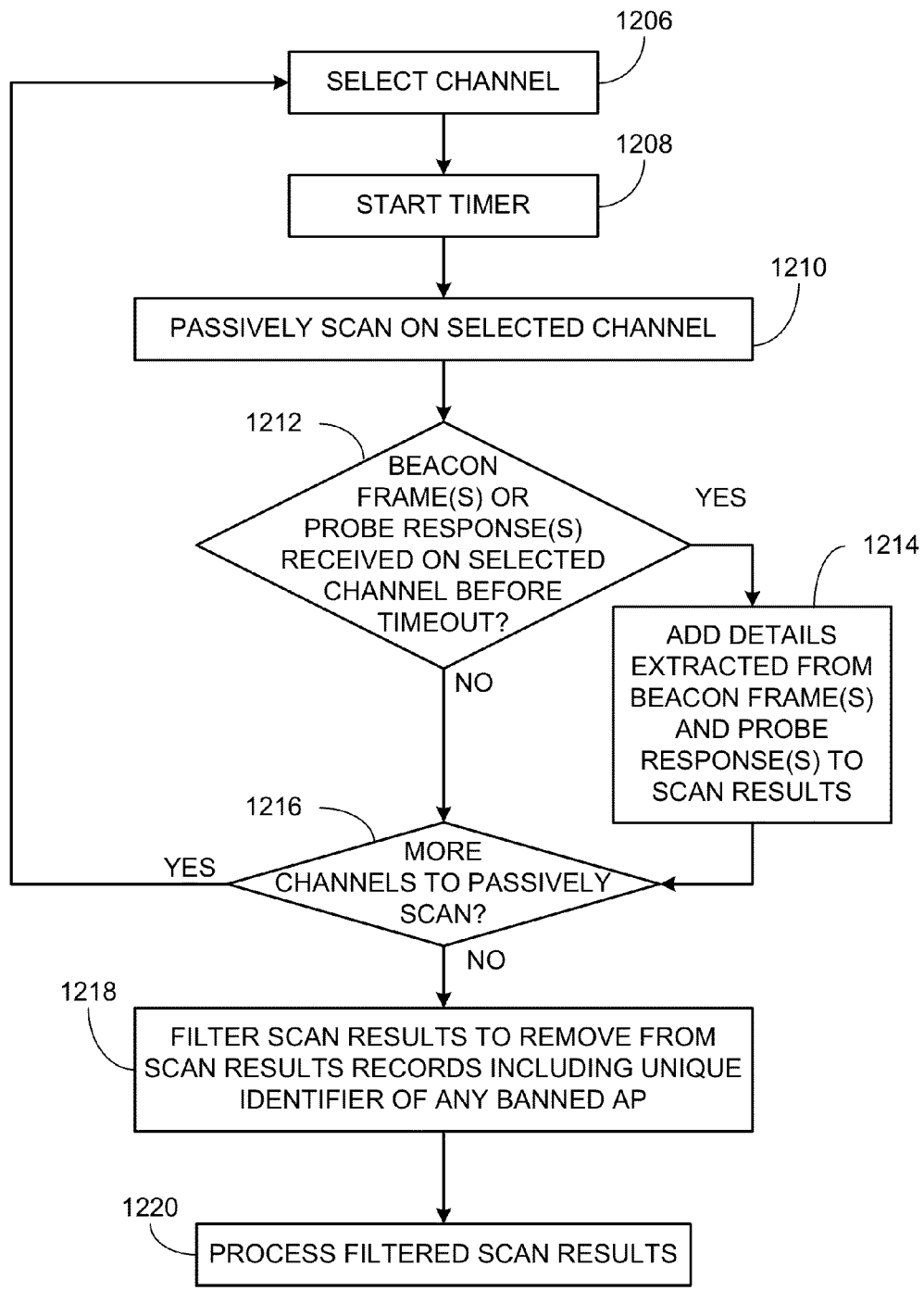
FIG. 12 is a flowchart illustrating an example of a method for passive scanning that takes into account whether an access point is banned, the method to be performed by a mobile station.

FIG. 12 is a flowchart illustrating an example of a method for passive scanning that takes into account whether an access point is banned, the method to be performed by a mobile station, for example, STA 102. Variations on how passive scanning is conducted by the STA are also contemplated, and the method illustrated in FIG. 12 is merely one example.

At 1206, the STA selects a channel upon which to do the passive scanning. The STA starts a timer at 1208, and the STA then passively scans at 1210 on the selected channel. This typically involves the STA listening for beacon frames transmitted by APs on the selected channel. The STA then waits to see if any beacon frames are received on the selected channel before the timer started at 1208 has a timeout. Only APs configured to operate on the selected channel will transmit beacon frames on the selected channel. APs configured to hide the network name will transmit beacon frames in which no network name is advertised. The STA may also receive one or more probe responses on the selected channel that are address to a different STA.

If the STA has received one or more beacon frames or probe responses or both on the selected channel before the timeout, as checked at 1212, the STA adds at 1214 to the scan results one or more records containing details extracted from the received one or more beacon frames or probe responses or both, and then proceeds to check at 1216 whether there are any other channels to passively scan. If so, the method proceeds to 1206 where the STA selects another channel.

If there are not any other channels to actively scan, the method proceeds to 1218 where the STA filters the scan results to remove from the scan results any records including the unique identifier of any banned AP. For example, if the STA maintains a list of MAC addresses of banned APs, the STA can compare at 1218 the MAC addresses in the records to the MAC addresses in the list. In a modified method for passive scanning, the filtering to remove records including the unique identifier of any banned AP may occur at 1214, for the selected channel, thus eliminating the need to filter the scan results after all channels to be passively scanned have been passively scanned.

After filtering the scan results, the STA processes at 1220 the filtered scan results of the passive scanning. For example, processing the filtered scan results may include automatically selecting a target AP from the filtered scan results without user intervention. In another example, processing the filtered scan results may include displaying, via a display of the STA, a list of available networks gleaned from the filtered scan results, so that a user of the STA can select a target AP from the displayed list.

The filtered results of active scanning and the filtered results of passive scanning may be combined, and then processing as described above with respect to 1120 and 1220 may be performed by the STA on the combined results.

Detailed Description of Suppression of Access Points

Figure 13:
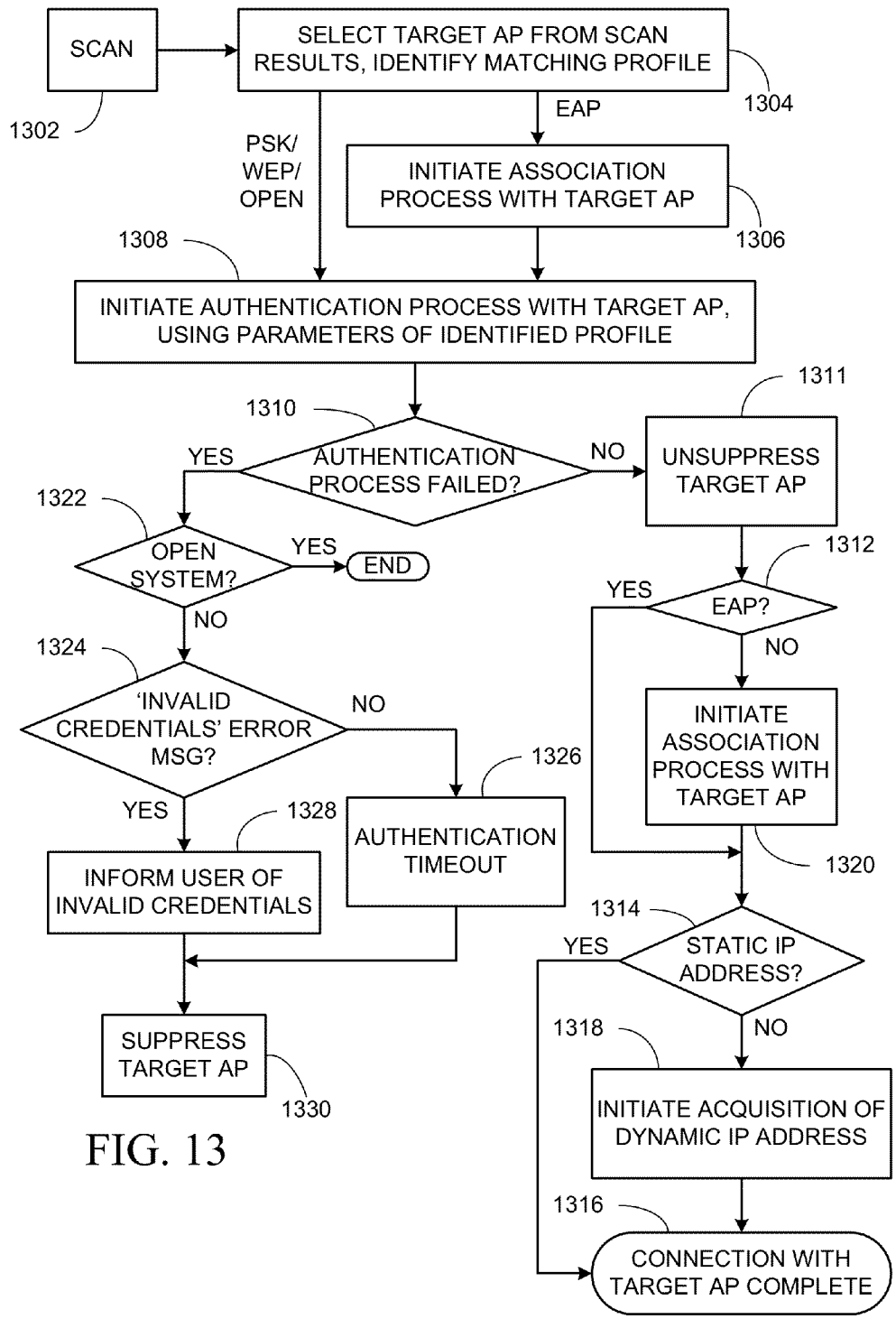
FIG. 13 is a flowchart illustrating an example of a method of joining a wireless local area network, the method to be performed by a mobile station, in which a target access point is suppressed if an authentication process between the mobile station and the target access point fails.

FIG. 13 is a flowchart illustrating an example of a method of joining a wireless local area network, the method to be performed by a mobile station, for example, STA 102, in which a target access point is suppressed if an authentication process between the mobile station and the target access point fails.

At 1302, the STA scans, using passive scanning or active scanning or any combination thereof, to identify APs in whose coverage area the STA is currently located.

At 1304, the STA selects a target AP from the scan results, thereby identifying a matching connection profile. The target AP may be automatically selected by the STA without user intervention. Alternatively, selection of the target AP may be indicated to the STA through activation by the user of the STA of a user input component of the STA.

Selecting a target AP may involve comparing the scan results to one or more of the connection profiles stored in the STA. A target AP whose beacon frame or probe response is in the scan results is considered a match to a particular connection profile if the following network details of the particular connection profile and the network details of the beacon frame or probe response are identical: network name, security type, and encryption type.

A suppressed AP will be eligible for selection as a target AP only occasionally. This restriction may be implemented by occasionally filtering suppressed APs from the scan results prior to selection of a target AP. Alternatively, or additionally, this restriction may be implemented in the process of selecting a target AP.

As noted above, if the security type of the target AP and the identified connection profile is "EAP", the STA proceeds to initiate at 1306 an association process with the target AP. This typically involves the STA sending an association request that is addressed to a unique identifier of the target AP. Assuming that the association process is successful, the STA then proceeds to initiate at 1308 an authentication process with the target AP, using parameters of the identified profile that are relevant for the authentication method being used. If the security type is "EAP", the target AP will act as an intermediary between the STA and an authorization server, for example, authentication server 108.

If the security type of the target AP and the identified connection profile is "Open System" or a Shared Key Authentication such as "WEP" or "PSK", then authentication precedes association and after selecting a target AP at 1304, the method proceeds directly to 1308 to initiate an authentication process with the target AP, using parameters of the identified profile that are relevant for the authentication method being used.

Initiation of an authentication process typically involves the STA sending an authentication request that is addressed to a unique identifier of the target AP. The credentials stored in the identified connection profile are transmitted by the STA in a manner receivable by the target AP.

If the authentication process has not failed, as checked at 1310, then the STA un-suppresses the target AP at 1311 if it was previously suppressed.

If the security type is "EAP", as checked at 1312, and if the STA has a static IP address, as checked at 1314, then the connection of the STA and the target AP is complete, as indicated at 1316.

If the security type is "EAP", as checked at 1312, and if the STA does not have a static IP address, as checked at 1314, then the STA initiates at 1318 with the target AP a process of dynamic IP address acquisition. As noted above, the process of dynamic IP address acquisition may involve a DHCP server, for example, DHCP server 110. Upon successful acquisition by the STA of a dynamic IP address, the connection of the STA and the target AP is complete, as indicated at 1316.

If security type is not "EAP", as checked at 1312, then the STA initiates at 1320 an association process with the target AP. This typically involves the STA sending an association request that is addressed to a unique identifier of the target AP. Assuming that the association process is successful, the next actions then depend upon whether the STA has a static IP address, as described hereinabove with respect to 1314, 1316 and 1318.

If the authentication process has failed, as checked at 1310, and the security type is not "Open System", as checked at 1322, this has been determined by the STA either through receipt by the STA of an "invalid credentials" error message from the target AP, as checked at 1324, or by an authentication timeout, as determined at 1326. If the STA has received an "invalid credentials" error message, the user is informed of this error at 1328, for example, by generation and display of an appropriate notification. Regardless of the cause for the authentication process failure, the STA suppresses the target AP at 1330.

As explained above, a problem with an authentication server may lead to an authentication timeout. If a subsequent attempt by the STA to authenticate with the target AP involves the redirection of the authentication request to a different authentication server, the subsequent attempt may succeed. Therefore, in a modified version of the method illustrated in FIG. 13, the STA suppresses the target AP only if the cause for authentication process failure is invalid credentials, and does not suppress the target AP if the cause for authentication process failure is authentication timeout.

Suppressing an access point may be implemented in the STA in any suitable manner. For example, a unique identifier of the access point, such as its MAC address, may be added to a suppression list when the access point is suppressed, and may be removed from the suppression list when the access point is un-suppressed.

Figure 14:
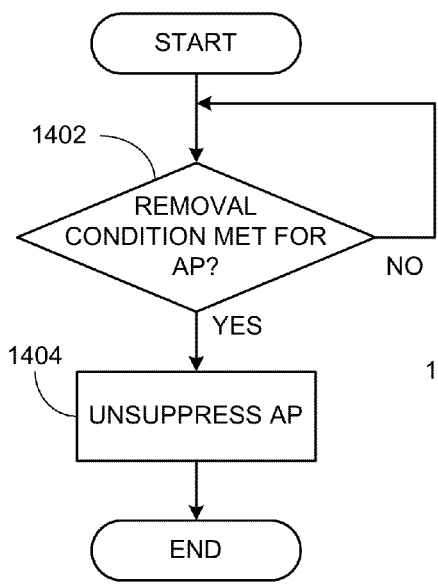
FIG. 14 is a flowchart illustrating an example method to be performed by a mobile station for un-suppressing an access point.
Figures 1, 14:
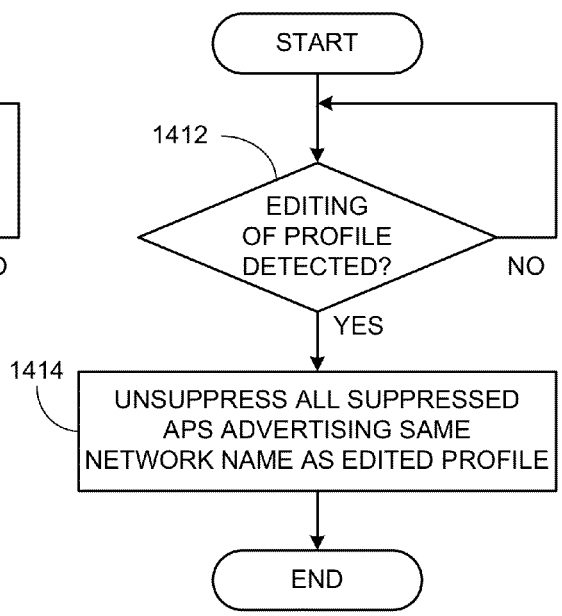
Figures 2, 14:
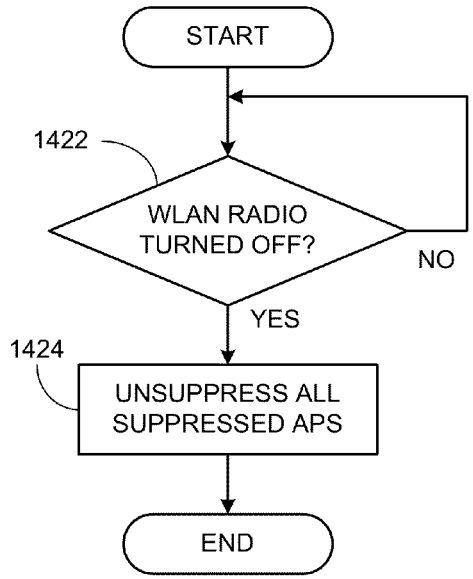

FIG. 14 is a flowchart illustrating an example method to be performed by a mobile station, for example, STA 102, for un-suppressing an access point. Upon detecting at 1402 that an un-suppress condition has been met for a suppressed AP, the STA proceeds at 1404 to un-suppress the suppressed AP. FIGS. 14-1 and 14-2 are flowcharts illustrating specific example methods to be performed by a mobile station, for example, STA 102, for un-suppressing one or more access points. In FIG. 14-1, upon detecting at 1412 that a connection profile has been edited, the STA proceeds at 1414 to un-suppress all suppressed APs advertising the same network name as that of the edited connection profile. For example, if suppressing APs is implemented in the STA using a suppression list as described above, each time a unique identifier of an AP is added to the suppression list, a copy of the record of the extracted details, including the network name, is associated in the suppression list with the unique identifier. The identification of suppressed APs having a particular network name is therefore straightforward. In FIG. 14-2, upon detecting at 1422 that a WLAN radio of the STA has been turned off, the STA proceeds at 1424 to un-suppress all suppressed APs.

Figure 15:
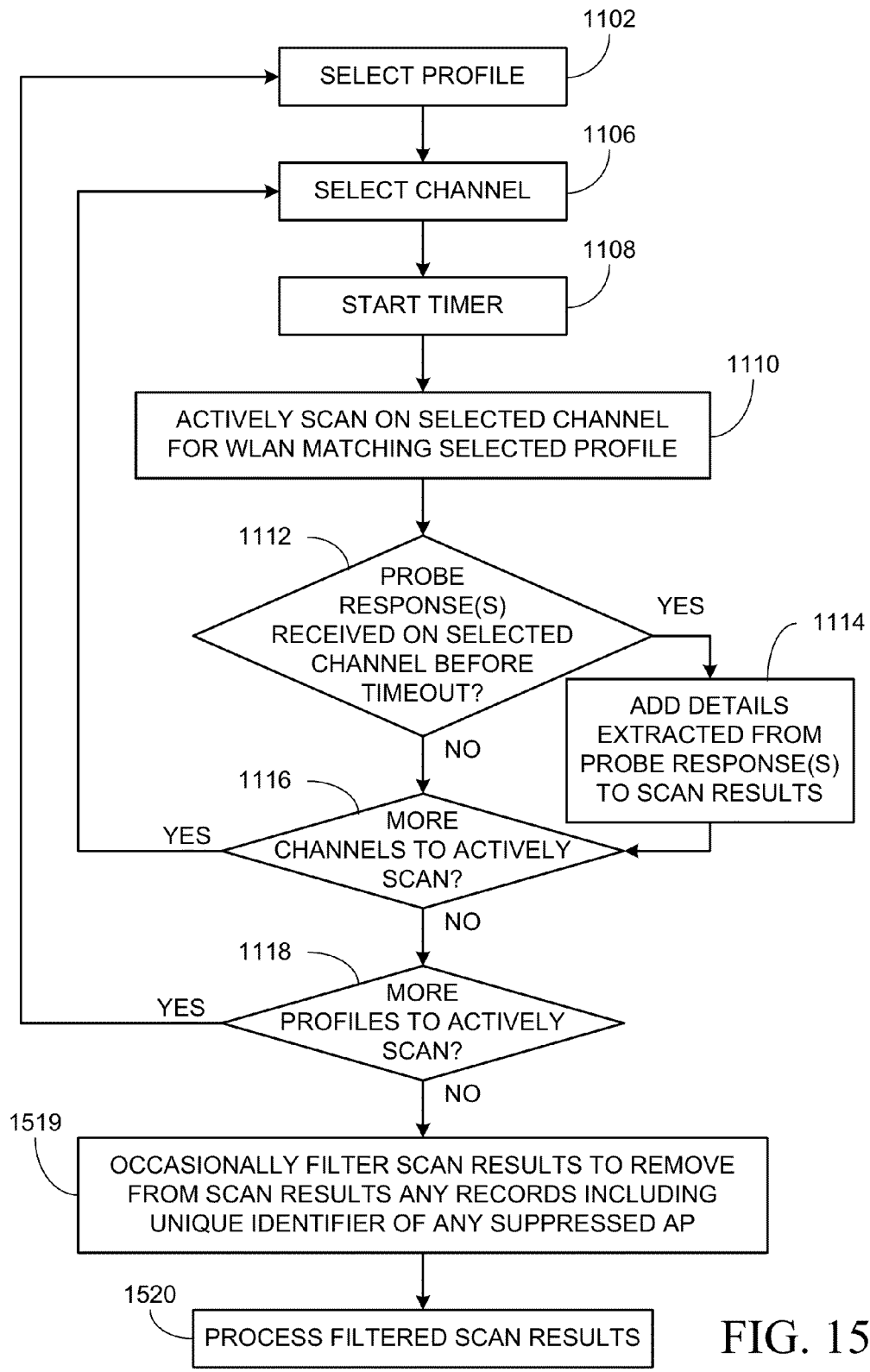
FIG. 15 is a flowchart illustrating an example of a method for active scanning that takes into account whether an access point is suppressed, the method to be performed by a mobile station.

FIG. 15 is a flowchart illustrating an example of a method for active scanning that takes into account whether an access point is suppressed, the method to be performed by a mobile station, for example, STA 102. Variations on how active scanning is conducted by the STA are also contemplated, and the method illustrated in FIG. 15 is merely one example.

The method illustrated in FIG. 15 is similar to the method illustrated in FIG. 11, as indicated by the repeated use of reference numerals used in FIG. 11. The description of FIG. 11 with respect to those reference numerals is applicable also to the method illustrated in FIG. 15, except as noted below.

If there are no other connection profiles to be actively scanned, as checked at 1118, then the STA occasionally filters the scan results of the active scanning at 1519 to remove from the scan results any records including the unique identifier of any suppressed AP. For example, if the STA maintains a list of MAC addresses of suppressed APs, the STA can compare at 1519 the MAC addresses in the records to the MAC addresses in the list.

After filtering the scan results, the STA processes at 1520 the filtered scan results of the active scanning. For example, processing the filtered scan results may include automatically selecting a target AP from the filtered scan results without user intervention. In another example, processing the filtered scan results may include displaying, via a display of the STA, a list of available networks gleaned from the filtered scan results, so that a user of the STA can select a target AP from the displayed list.

Figure 16:
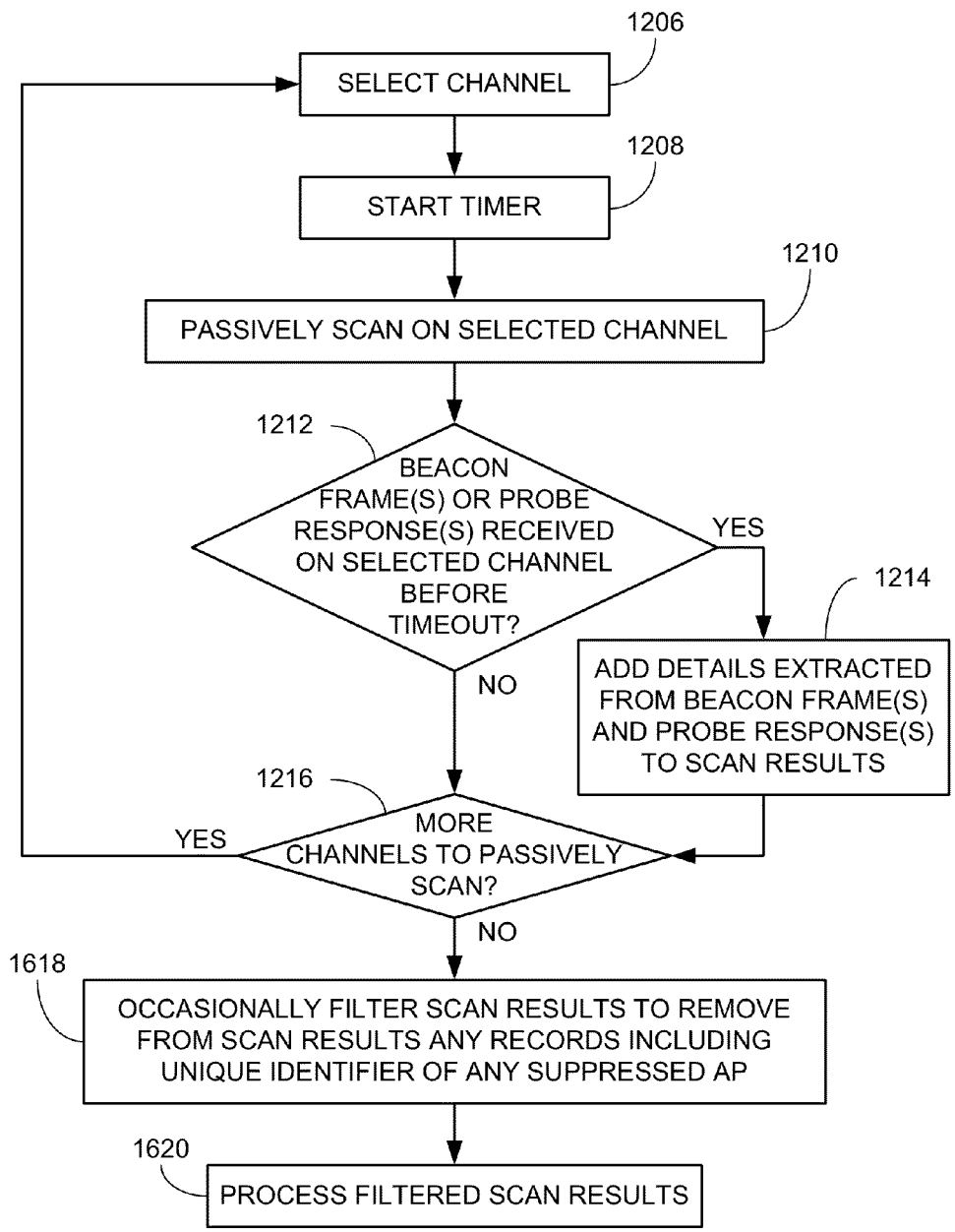
FIG. 16 is a flowchart illustrating an example of a method for passive scanning that takes into account whether an access point is suppressed, the method to be performed by a mobile station.

FIG. 16 is a flowchart illustrating an example of a method for passive scanning that takes into account whether an access point is suppressed, the method to be performed by a mobile station, for example, STA 102. Variations on how passive scanning is conducted by the STA are also contemplated, and the method illustrated in FIG. 16 is merely one example.

The method illustrated in FIG. 16 is similar to the method illustrated in FIG. 12, as indicated by the repeated use of reference numerals used in FIG. 12. The description of FIG. 12 with respect to those reference numerals is applicable also to the method illustrated in FIG. 16, except as noted below.

If there are no other channels to be passively scanned, as checked at 1218, then the STA occasionally filters the scan results of the passive scanning at 1618 to remove from the scan results any records including the unique identifier of any suppressed AP. For example, if the STA maintains a list of MAC addresses of suppressed APs, the STA can compare at 1618 the MAC addresses in the records to the MAC addresses in the list.

After filtering the scan results, the STA processes at 1620 the filtered scan results of the passive scanning. For example, processing the filtered scan results may include automatically selecting a target AP from the filtered scan results without user intervention. In another example, processing the filtered scan results may include displaying, via a display of the STA, a list of available networks gleaned from the filtered scan results, so that a user of the STA can select a target AP from the displayed list.

The filtered results of active scanning and the filtered results of passive scanning may be combined, and then processing as described above with respect to 1520 and 1620 may be performed by the STA on the combined results.

The issue of how often the STA filters the scan results to remove results including the unique identifier of any suppressed AP is a tradeoff between power consumption (filter more often) and responsiveness (filter less often). For example, the filtering may be done every other time the method illustrated in FIG. 15 or FIG. 16 is performed, or every third time.

In another example, a timer may be used to determine how often to filter the scan results. For example, the scan results may be filtered every five minutes.

Detailed Description of Suppressing then Banning Access Points

Figure 17:
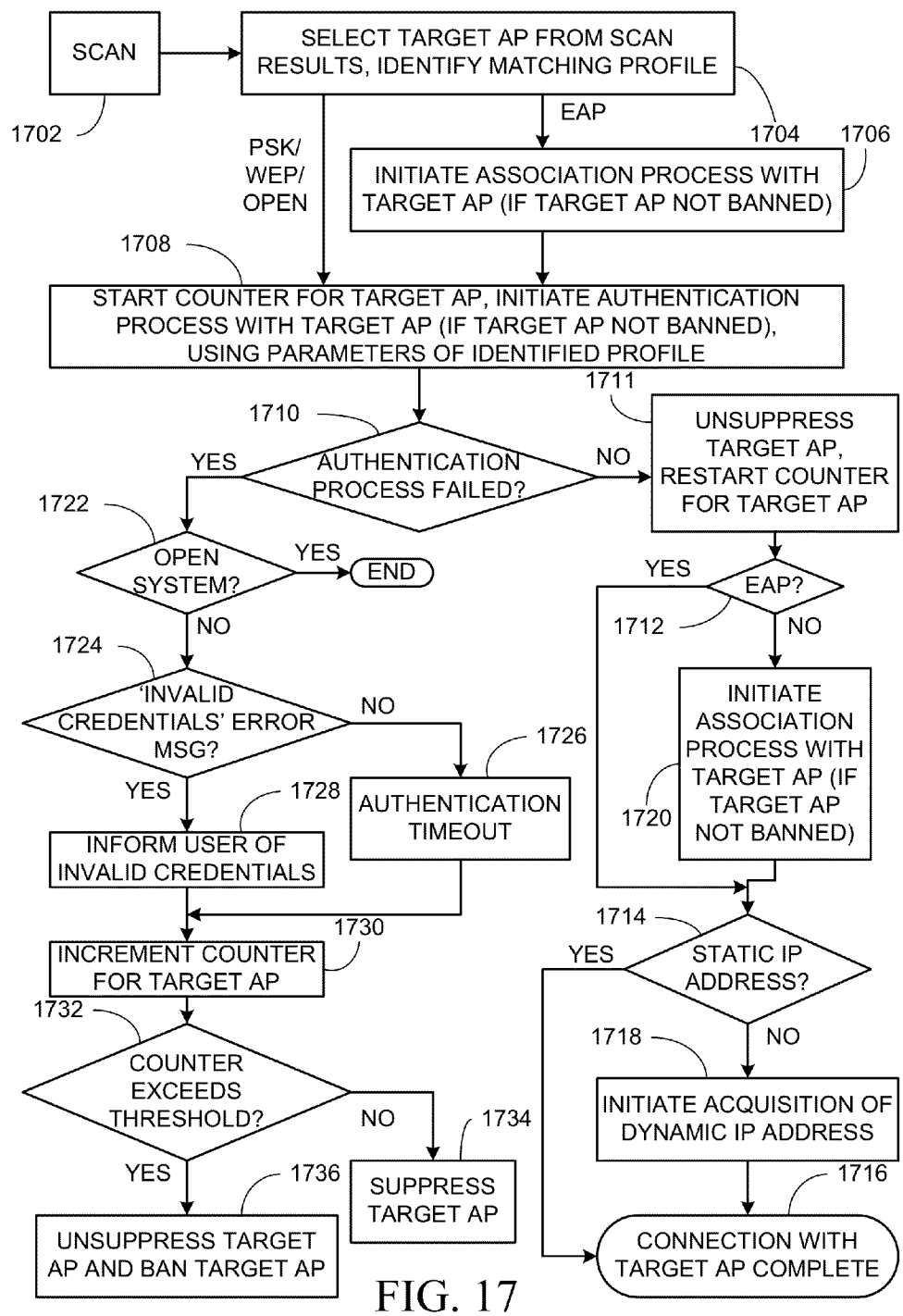
FIG. 17 is a flowchart illustrating an example of a method of joining a wireless local area network, the method to be performed by a mobile station, in which a target access point is suppressed if an authentication process between the mobile station and the target access point fails and if the authentication process fails too many times, the target access point is banned.

FIG. 17 is a flowchart illustrating an example of a method of joining a wireless local area network, the method to be performed by a mobile station, for example, STA 102, in which a target access point is suppressed if an authentication process between the mobile station and the target access point fails and if the authentication process fails too many times, the target access point is banned.

At 1702, the STA scans, using passive scanning or active scanning or any combination thereof, to identify APs in whose coverage area the STA is currently located.

At 1704, the STA selects a target AP from the scan results, thereby identifying a matching connection profile. The target AP may be automatically selected by the STA without user intervention. Alternatively, selection of the target AP may be indicated to the STA through activation by the user of the STA of a user input component of the STA.

Selecting a target AP may involve comparing the scan results to one or more of the connection profiles stored in the STA. A target AP whose beacon frame or probe response is in the scan results is considered a match to a particular connection profile if the following network details of the particular connection profile and the network details of the beacon frame or probe response are identical: network name, security type, and encryption type.

A banned AP will not be selected as a target AP. This restriction may be implemented by filtering banned APs from the scan results prior to selection of a target AP. Alternatively, or additionally, this restriction may be implemented in the process of selecting a target AP.

A suppressed AP will be eligible for selection as a target AP only occasionally. This restriction may be implemented by occasionally filtering suppressed APs from the scan results prior to selection of a target AP. Alternatively, or additionally, this restriction may be implemented in the process of selecting a target AP.

If the security type of the target AP and the identified connection profile is "EAP", the STA proceeds to initiate at 1706 an association process with the target AP, provided that the target AP is not banned. This typically involves the STA sending an association request that is addressed to a unique identifier of the target AP. Since the STA refrains from sending communications addressed to the unique identifier of a banned AP, the STA will not initiate an association process with a banned AP. Assuming that the association process is successful, the STA then proceeds at 1708 to start a counter for the target AP and to initiate an authentication process with the target AP, provided that the target AP is not banned, using parameters of the identified profile that are relevant for the authentication method being used. If the security type is "EAP", the target AP will act as an intermediary between the STA and an authorization server, for example, authentication server 108.

If the security type of the target AP and the identified connection profile is "Open System" or a Shared Key Authentication such as "WEP" or "PSK", then authentication precedes association and after selecting a target AP at 1704, the method proceeds directly to 1708 to initiate an authentication process with the target AP, provided that the target AP is not banned, using parameters of the identified profile that are relevant for the authentication method being used.

Initiation of an authentication process typically involves the STA sending an authentication request that is addressed to a unique identifier of the target AP. The credentials stored in the identified connection profile are transmitted by the STA in a manner receivable by the target AP. Since the STA refrains from sending communications addressed to the unique identifier of a banned AP, the STA will not initiate an authentication process with a banned AP.

If the authentication process has not failed, as checked at 1710, then the STA un-suppresses the target AP at 1711 if it was previously suppressed and restarts the counter for the target AP.

If the security type is "EAP", as checked at 1712, and if the STA has a static IP address, as checked at 1714, then the connection of the STA and the target AP is complete, as indicated at 1716.

If the security type is "EAP", as checked at 1712, and if the STA does not have a static IP address, as checked at 1714, then the STA initiates at 1718 with the target AP a process of dynamic IP address acquisition. As noted above, the process of dynamic IP address acquisition may involve a DHCP server, for example, DHCP server 110. Upon successful acquisition by the STA of a dynamic IP address, the connection of the STA and the target AP is complete, as indicated at 1716.

If the security type is not "EAP", as checked at 1712, then the STA initiates at 1720 an association process with the target AP, provided that the target AP is not banned. This typically involves the STA sending an association request that is addressed to a unique identifier of the target AP. Assuming that the association process is successful, the next actions then depend upon whether the STA has a static IP address, as described hereinabove with respect to 1714, 1716 and 1718.

If the authentication process has failed, as checked at 1710, and the security type is not "Open System", as checked at 1722, this has been determined by the STA either through receipt by the STA of an "invalid credentials" error message from the target AP, as checked at 1724, or by an authentication timeout, as determined at 1726. If the STA has received an "invalid credentials" error message, the user is informed of this error at 1728, for example, by generation and display of an appropriate notification. Regardless of the cause for the authentication process failure, the STA increments the counter for the target AP at 1730. If the counter does not exceed a threshold, as checked at 1732 by the STA, the STA suppresses the target AP at 1734. If the counter exceeds the threshold, the STA un-suppresses the target AP and bans the target AP at 1736.

As explained above, a problem with an authentication server may lead to an authentication timeout. If a subsequent attempt by the STA to authenticate with the target AP involves the redirection of the authentication request to a different authentication server, the subsequent attempt may succeed. Therefore, in a modified version of the method illustrated in FIG. 17, the STA increments the counter for the target AP only if the cause for authentication process failure is invalid credentials, and does not ban or suppress the target AP if the cause for authentication process failure is authentication timeout.

Figure 18:
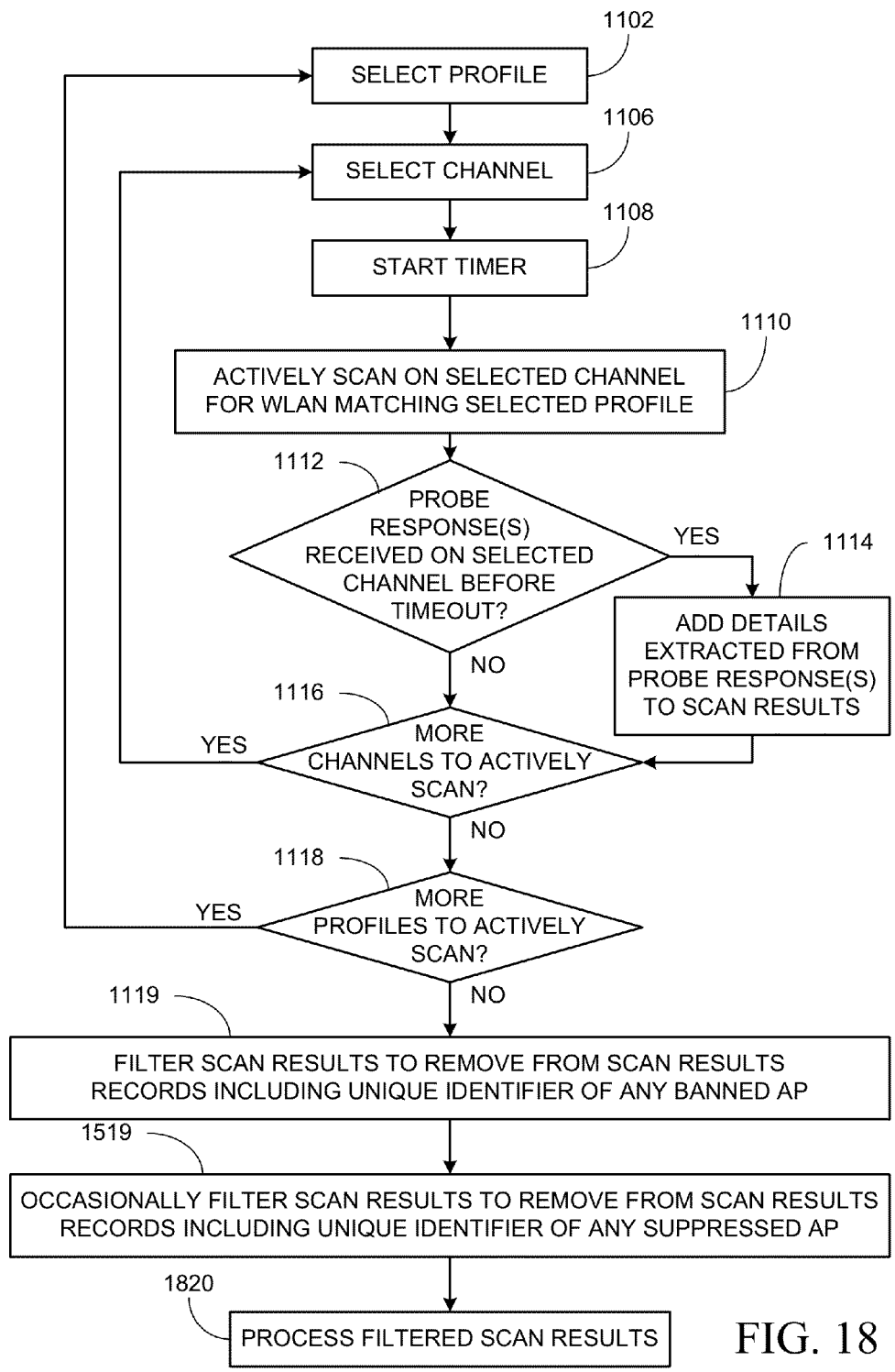
FIG. 18 is a flowchart illustrating an example of a method for active scanning that takes into account whether an access point is suppressed or banned, the method to be performed by a mobile station.

FIG. 18 is a flowchart illustrating an example of a method for active scanning that takes into account whether an access point is suppressed or banned, the method to be performed by a mobile station, for example, STA 102. Variations on how active scanning is conducted by the STA are also contemplated, and the method illustrated in FIG. 18 is merely one example.

The method illustrated in FIG. 18 is similar to the methods illustrated in FIG. 11 and FIG. 15, as indicated by the repeated use of reference numerals used in FIG. 11 and FIG. 15. The description of FIG. 11 and FIG. 15 with respect to those reference numerals is applicable also to the method illustrated in FIG. 18, except as noted below.

If there are no other connection profiles to be actively scanned, as checked at 1118, then the STA filters the scan results of the active scanning at 1119 to remove from the scan results any records including the unique identifier of any banned AP, and the STA occasionally filters the scan results of the active scanning at 1519 to remove from the scan results any records including the unique identifier of any suppressed AP.

After filtering the scan results, the STA processes at 1820 the filtered scan results of the active scanning. For example, processing the filtered scan results may include automatically selecting a target AP from the filtered scan results without user intervention. In another example, processing the filtered scan results may include displaying, via a display of the STA, a list of available networks gleaned from the filtered scan results, so that a user of the STA can select a target AP from the displayed list.

Figure 19:
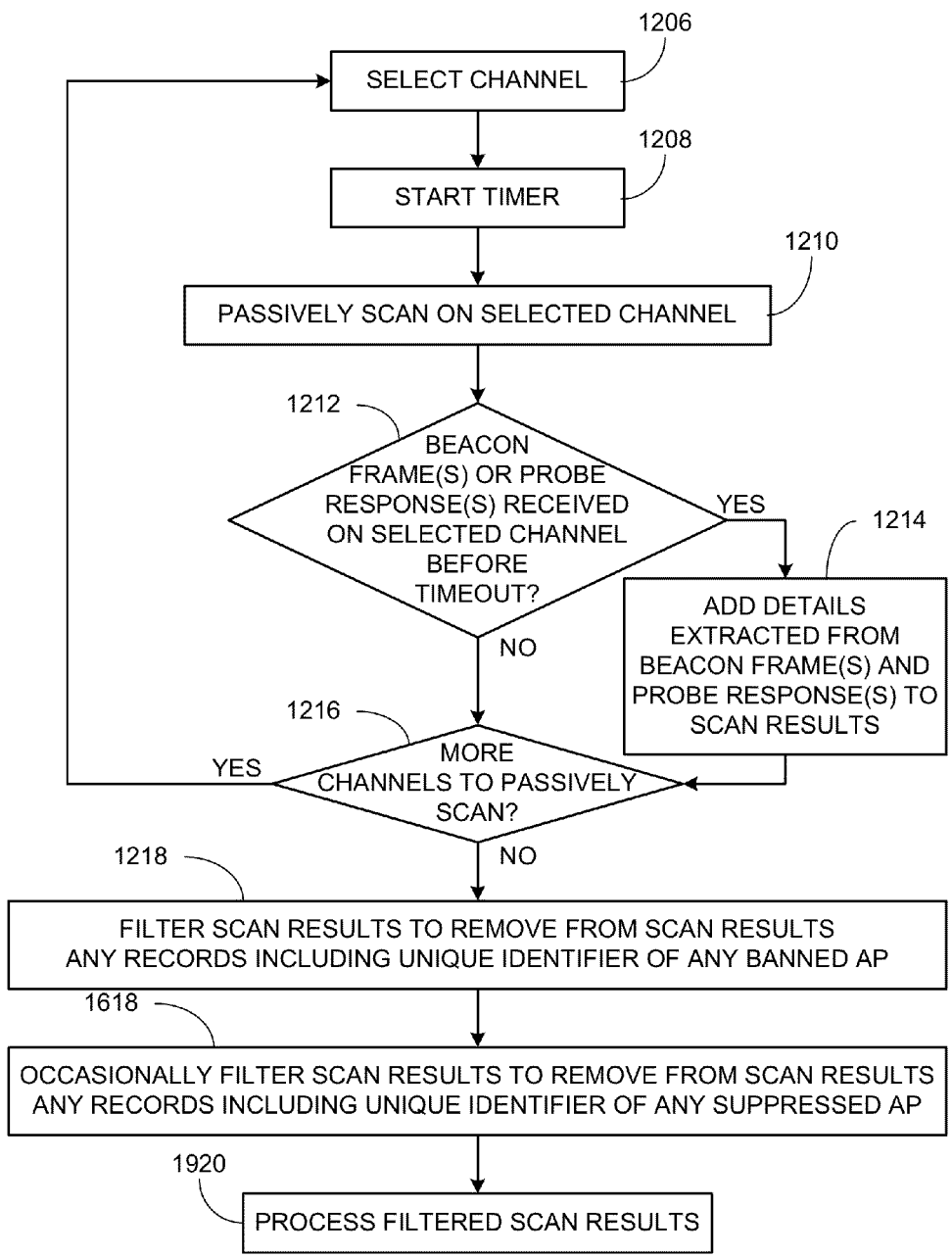
FIG. 19 is a flowchart illustrating an example of a method for passive scanning that takes into account whether an access point is suppressed or banned, the method to be performed by a mobile station.

FIG. 19 is a flowchart illustrating an example of a method for passive scanning that takes into account whether an access point is suppressed or banned, the method to be performed by a mobile station, for example, STA 102. Variations on how passive scanning is conducted by the STA are also contemplated, and the method illustrated in FIG. 19 is merely one example.

The method illustrated in FIG. 19 is similar to the methods illustrated in FIG. 12 and FIG. 16, as indicated by the repeated use of reference numerals used in FIG. 12 and FIG. 16. The description of FIG. 12 and FIG. 16 with respect to those reference numerals is applicable also to the method illustrated in FIG. 19, except as noted below.

If there are no other channels to be passively scanned, as checked at 1218, then the STA filters the scan results of the passive scanning at 1218 to remove from the scan results any records including the unique identifier of any banned AP, and the STA occasionally filters the scan results of the passive scanning at 1618 to remove from the scan results any records including the unique identifier of any suppressed AP.

After filtering the scan results, the STA processes at 1920 the filtered scan results of the passive scanning. For example, processing the filtered scan results may include automatically selecting a target AP from the filtered scan results without user intervention. In another example, processing the filtered scan results may include displaying, via a display of the STA, a list of available networks gleaned from the filtered scan results, so that a user of the STA can select a target AP from the displayed list.

The filtered results of active scanning and the filtered results of passive scanning may be combined, and then processing as described above with respect to 1820 and 1920 may be performed by the STA on the combined results.

Modifications of the methods described hereinabove will occur to persons of ordinary skill in the art. For example, the methods described hereinabove automatically ban a connection profile or ban an access point or suppress an access point if authentication has failed. In an alternative implementation, the action to be taken upon failure of the authentication process could be chosen by a user of the STA, after being presented with two or more options (including, for example, the option of taking no action).

Detailed Description of Mobile Station

Figure 20:
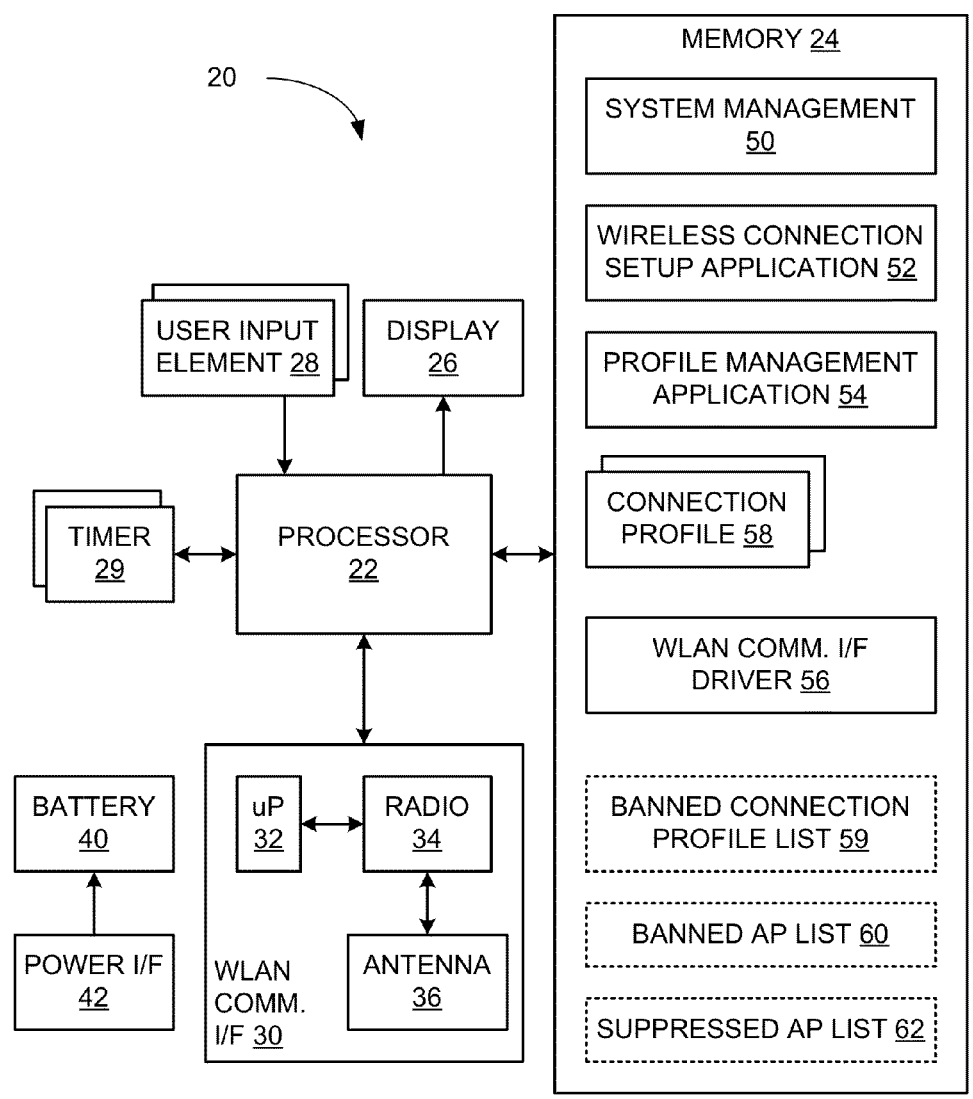
FIG. 20 is a functional block diagram illustration of an example mobile station.

FIG. 20 is a functional block diagram illustration of an example mobile station, which can be considered an example of STA 102. The example mobile station, generally referenced 20, comprises a processor 22, a memory 24, a display 26, one or more user input elements 28, one or more timers 29, and a WLAN communication interface 30. A non-exhaustive list of examples for user input elements 28 includes a keypad, a keyboard, a trackball, and a thumbwheel. Some mobile stations use a touchscreen, which functions both as display 26 and as one of the user input elements 28. WLAN communication interface 30 comprises a baseband processor 32 coupled to a radio 34, which in turn is coupled to an antenna 36.

A battery 40 supplies power to the components of mobile station 20. Battery 40 is typically removable from mobile station 20. Mobile station 20 also comprises a power interface 42, for example, a universal serial bus (USB) interface connection or an AC/DC adapter, which enables battery 40 to be recharged from an external power source.

Mobile station 20 may comprise additional components, circuitry and functionality which, for clarity, have not been illustrated in FIG. 20.

Memory 24 is coupled to processor 22 and comprises volatile memory and non-volatile memory. Portions of memory 24 may be internal to processor 22. Memory 24 stores applications executable by processor 22, including, for example, a system management application 50, a wireless connection setup application 52, a connection profile management application 54, and a WLAN communication interface driver 56. Memory 24 also stores data files used by the applications, including, for example, one or more connection profiles 58. If mobile station 20 implements the banning of connection profiles as described herein through the use of a list of banned connection profiles, then memory 24 may optionally store a list 59 of banned connection profiles. A banned connection profile may be identified in list 59 by its network name. If mobile station 20 implements the banning of access points as described herein through the use of a list of banned access points, then memory 24 may optionally store a list 60 of banned APs. A banned AP may be identified in list 60 by its unique identifier, for example, by its MAC address. If mobile station 20 implements the suppression of access points as described herein through the use of a list of suppressed access points, then memory 24 may optionally store a list 62 of suppressed APs. A suppressed AP may be identified in list 62 by its unique identifier, for example, by its MAC address.

Methods described herein may be implemented by way of computer instructions to be executed by processor 22 or processor 32. For example, scanning is implemented by processor 32 under the control of WLAN communication interface driver 56. Profile management application 54 may be used to enable the editing of connection profiles 58. Wireless connection setup application 52 may be used to enable the creation of connection profiles 52 and to guide a user of mobile station through the process of scanning and connecting to a WLAN, including, for example, generating a list of available WLANs to be displayed via display 26.

The banning and un-banning of connection profiles may be implemented as computer instructions in WLAN communication interface driver 56, and the generation of a visual indication of a banned connection profile may be implemented as computer instructions in profile management application 54. If, as described herein, connection profiles 58 include a field which is set to a first value if the connection profile is not banned and set to a second value if the connection profile is banned, then the setting of that field may be implemented as computer instructions in profile management application 54.

The banning and un-banning of access points may be implemented as computer instructions in WLAN communication interface driver 56, and the generation of a notification regarding invalid credentials may be implemented as computer instructions in wireless connection setup application 52.

The suppressing and un-suppressing of access points may be implemented as computer instructions in WLAN communication interface driver 56, and the generation of a notification regarding invalid credentials may be implemented as computer instructions in wireless connection setup application 52.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a mobile station, the method comprising:
attempting to perform an authentication process with an access point, including transmitting in a manner receivable by the access point parameters from an editable connection profile stored in the mobile station, wherein the editable connection profile includes a network name;
determining that the authentication process has failed and consequently banning the editable connection profile;
if any active scanning for wireless local area networks, other than active scanning performed as part of a discovery scan, is performed by the mobile station while the editable connection profile is banned, excluding the editable connection profile from the active scanning; and
if any passive scanning for wireless local area networks, other than passive scanning performed as part of a discovery scan, is performed by the mobile station while the editable connection profile is banned, removing from results of the passive scanning any records including the network name of the editable connection profile.

2. The method as claimed in claim 1, further comprising:
starting a timer as a result of failing to succeed in the authentication process; and
un-banning the editable connection profile as a consequence of expiry of the timer.

3. The method as claimed in claim 1, further comprising:
detecting that the editable connection profile has been edited and consequently un-banning the editable connection profile.

4. The method as claimed in claim 1, further comprising:
detecting that a wireless local area network radio of the mobile station has been turned off and consequently un-banning the editable connection profile.

5. The method as claimed in claim 1, further comprising:
un-banning the editable connection profile if the editable connection profile is selected for connection from results of a discovery scan and if user input indicative of approval to un-ban the editable connection profile is received.

6. The method as claimed in claim 1, further comprising:
detecting that the mobile station is no longer in a coverage area of any access point supporting a wireless local area network with the network name and consequently un-banning the editable connection profile.

7. A mobile station comprising:
a processor;
a wireless local area network communication interface coupled to the processor; and
a memory coupled to the processor, wherein the memory stores an editable connection profile that includes parameters and a network name, and a driver for the wireless local area network communication interface,
wherein the driver, when executed by the processor, is arranged to determine whether an attempt by the mobile station to perform an authentication process with an access point has failed and, if the attempt has failed, is arranged to consequently ban the editable connection profile, wherein the attempt included transmitting the parameters in a manner receivable by the access point,
wherein the driver, when executed by the processor, is arranged to exclude the editable connection profile from any active scanning for wireless local area networks performed by the mobile station while the editable connection profile is banned other than active scanning performed as part of a discovery scan, and
wherein the driver, when executed by the processor, is arranged to remove any records including the network name of the editable connection profile from results of any passive scanning for wireless local area networks performed by the mobile station while the editable connection profile is banned other than passive scanning performed as part of the discovery scan.

* * * * *